United States Patent
Monoi et al.

(10) Patent No.: US 6,518,375 B1
(45) Date of Patent: Feb. 11, 2003

(54) CATALYST FOR THE PRODUCTION OF ETHYLENE POLYMER AND PROCESS FOR PRODUCING ETHYLENE POLYMER

(75) Inventors: Takashi Monoi, Ohita (JP); Haruhiko Ikeda, Ohita (JP); Hidenobu Torigoe, Ohita (JP)

(73) Assignee: Japan Polyolefins Co., Ltd., Tokyo (JP)

( * ) Notice: Subject to any disclaimer, the term of this patent is extended or adjusted under 35 U.S.C. 154(b) by 0 days.

(21) Appl. No.: 09/541,899

(22) Filed: Apr. 3, 2000

(30) Foreign Application Priority Data

| Apr. 1, 1999 | (JP) | 11-094628 |
| Jan. 14, 2000 | (JP) | 2000-006487 |
| Jan. 14, 2000 | (JP) | 2000-006495 |

(51) Int. Cl.⁷ ................................................ C08F 4/22
(52) U.S. Cl. .................. 526/104; 526/352; 526/95; 526/89; 502/232; 502/240; 502/254; 502/152; 502/104
(58) Field of Search ................... 502/232, 240, 502/254, 152, 104; 526/352, 104, 95, 89

(56) References Cited

U.S. PATENT DOCUMENTS

| 3,798,250 A | * | 3/1974 | Kruse et al. | 260/438.5 R |
| 4,376,722 A | * | 3/1983 | Chester et al. | 252/430 |
| 4,806,513 A | * | 2/1989 | McDaniel et al. | 502/107 |

FOREIGN PATENT DOCUMENTS

| EP | 0861854 | 9/1998 |
| GB | 1358611 | 7/1974 |
| JP | 44-2996 | 2/1969 |
| JP | 44-3827 | 2/1969 |
| JP | 45-40902 | 12/1970 |
| JP | 47-1766 | 1/1972 |
| JP | 47-13002 | 4/1972 |
| JP | 47-16647 | 5/1972 |
| JP | 47-26429 | 7/1972 |
| JP | 47-16590 | 9/1972 |
| JP | 47-17753 | 9/1972 |
| JP | 50-68985 | 6/1975 |
| JP | 52-31226 | 8/1977 |
| JP | 58-25323 | 5/1983 |
| JP | 3-18645 | 3/1991 |
| JP | 7-502783 | 3/1995 |
| JP | 8-512339 | 12/1996 |
| JP | 10-338707 | 12/1998 |

OTHER PUBLICATIONS

Barker et al., Journal of Chemical Society Dalton, 734–740 (1978).*

(List continued on next page.)

*Primary Examiner*—David W. Wu
*Assistant Examiner*—Ling-Siu Choi
(74) *Attorney, Agent, or Firm*—Sughrue Mion, PLLC

(57) ABSTRACT

A catalyst for the production of an ethylene polymer comprising a specific trivalent alkyl chromium compound, an inorganic oxide solid and optionally an organoaluminum compound (first catalyst), a catalyst for the production of an ethylene polymer comprising the specific trivalent alkyl chromium compound, a specific tetravalent alkyl chromium compound and an inorganic oxide solid (second catalyst) and a process for producing an ethylene polymer using those catalysts. The first catalyst of the present invention does not cause deterioration with the passage of time, is stable to heat and light, has greatly improved activity and can efficiently produce an ethylene copolymer with α-olefin. The second catalyst of the present invention can efficiently produce an ethylene polymer having low molecular weight and narrow molecular weight distribution suitable for use in injection molding or an ethylene polymer having excellent balance between rigidity and ESCR and also excellent moldability suitable for use in blow molding or film molding.

13 Claims, 2 Drawing Sheets

OTHER PUBLICATIONS

Thomas J. Pullukat and Raymond E. Hoff, "Silica–Based Ziegler–Natta Catalysts: A Patent Review", *Catal. Rev.–Sci. Eng.*, 41 (3 &4), 389–428 (1999).

Bert M. Weckhuysen and Robert A. Schoonheydt, "Olefin Polymerization Over Supported Chromium Oxide Catalysts", *Catalysis Today*, 51 (1999) 215–221.

European Search Report.

Barker, Geoffrey K. et al: "Silylmethyl and related complexes. Part 6. Preparation, properties and crystal and molecular structure of tris[bis(trimethylsilyl)methyl]chromium(III); the chemistry of related compounds of titanium(III), vanadium(III), zirconium(IV), and hafnium(IV)", J. Chem. Soc., Dalton Trans. (1978), (7), 734–40 XP000914956.

* cited by examiner

CATALYST FOR THE PRODUCTION OF ETHYLENE POLYMER AND PROCESS FOR PRODUCING ETHYLENE POLYMER

FIELD OF THE INVENTION

The present invention relates to a catalyst for the production of an ethylene polymer using a trivalent alkyl chromium compound and a process for producing an ethylene polymer using the catalyst. More particularly, the invention relates to a catalyst for the production of an ethylene polymer using a trivalent alkyl chromium compound, a catalyst for the production of an ethylene polymer using a trivalent alkyl chromium compound and a tetravalent alkyl chromium compound and a process for producing an ethylene polymer using those catalysts.

BACKGROUND OF THE INVENTION

It is well known that a catalyst for the production of an ethylene polymer obtained by supporting an organochromium compound on an inorganic oxide solid has inherent performances such that it is possible to adjust a molecular weight with hydrogen and an ethylene polymer obtained has a narrow molecular weight distribution, as being different from a so-called Phillips catalyst obtained by supporting a chromium compound on an inorganic oxide solid and then conducting activation in a non-reducing atmosphere such as air or oxygen.

Examples of such a catalyst include a so-called chromocene catalyst comprising bis(cyclopentadienyl) chromium(II) supported on silica or the like as disclosed in JP-A-50-68985, U.S. Pat. No. 3,879,368, U.S. Pat. No. 3,687,920, JP-B-50-68985, JP-B-52-31226, Canadian Patent 1,087,595, JP-B-58-25323, U.S. Pat. No. 4,101,445, U.S. Pat. No. 4,424,139 and Published Japanese Translation of International Patent Application Hei. 8-512339; a catalyst comprising dicumene chromium(0) supported on silica or the like as disclosed in JP-B-47-16647 and U.S. Pat. No. 4,364,841; a catalyst comprising bis(indenyl)chromium(II) or bis(fluorenyl)chromium(II) supported on silica or the like as disclosed in U.S. Pat. No. 4,015,059; a catalyst comprising (pentamethylcyclopentadienyl)(2-methylpentadienyl) chromium(II) supported on silica or the like as disclosed in U.S. Pat. No. 5,169,817; a catalyst comprising π-allyl chromium(II) supported on silica or the like as disclosed in JP-B-47-13002 and JP-B-47-26429; a catalyst comprising tetraneopentyl chromium(IV) supported on silica or the like as disclosed in U.S. Pat. No. 3,798,250; a catalyst comprising tetrakis(bicycloheptyl) chromium(IV) supported on silica or the like as disclosed in JP-A-47-16590; and a catalyst comprising octakis(alkylsilyl) tetrachromium(II) multinuclear complex supported on silica or the like as disclosed in U.S. Pat. No. 4,668,808. These catalysts use organochromium compounds in which the valency of the chromium atom is 0, 2 or 4, and there are only a few cases to use a trivalent organochromium compound.

Example of an ethylene polymer obtained by supporting a trivalent organochromium compound on an inorganic oxide solid is a catalyst comprising tris(bicycloheptyl) chromium(III) supported on silica as disclosed in, for example, JP-A-47-17753. In the case of this catalyst, tris (bicycloheptyl)chromium(III) which is a trivalent organochromium compound is unstable to heat and/or light and is liable to decompose. As a result, even if the compound is supported on silica to form a catalyst, the compound causes deterioration of activity with the passage of time and the catalyst cannot be stored. Thus it is difficult to obtain a catalyst having stable quality and an ethylene polymer. Further, a catalyst comprising a component comprising cyclopentadienyl chromium(III) hydrocarbyl compound supported on an inorganic carrier such as silica, and an alkyl aluminum compound is known as disclosed in U.S. Pat. No. 5,418,200, JP-A-7-502783, WO 96-27621 and WO 96-23006. In the case of this catalyst, deterioration with the passage of time is difficult to cause, but activity per catalyst and activity per chromium atom are very low. Thus, such a catalyst is poor economical property and is not suitable for industrial use. Further, since catalyst residue remains in the polymer obtained in a large amount, a product colors and deterioration is accelerated, thus giving adverse influence. Furthermore, since this catalyst is difficult to catalyze copolymerization with α-olefin such as 1-butene and 1-hexene, it is difficult to control a density of an ethylene polymer. Thus, the catalyst has a great disadvantage that only a product having a very limited high density can be produced. As described above, there have been practical problems in the catalyst for the production of an ethylene polymer, obtained by supporting the trivalent organochromium compound on an inorganic oxide solid.

Therefore, a first object of the present invention is to provide a catalyst for the production of an ethylene polymer, which overcomes the problems of the catalyst using the trivalent organochromium compound, does not cause deterioration with the passage of time, is stable to heat and light, improves its activity, and is capable of catalyze copolymerization with α-olefin, and a process for producing an ethylene polymer efficiently using the catalyst.

The ethylene polymer is generally widely used as a resin material for various molded articles, but the properties required in the ethylene polymer vary depending on the molding method and the purpose of use. For example, a product molded by an injection molding has a relatively low molecular weight, and use of a polymer having a narrow molecular weight distribution is suitable. On the other hand, a product molded by a blow molding or a film molding has a relatively high molecular weight, and use of a polymer having a broad molecular weight distribution is suitable. It has conventionally been known that an ethylene polymer having a broad molecular weight distribution suitable for a blow molding, a film molding and the like can be obtained using a Phillips catalyst prepared by supporting a chromium compound such as chromium trioxide, chromium acetate or tris(acetylacetonato)chromium on an inorganic oxide solid such as silica and activating the same in oxygen gas or air.

Further, an ethylene polymer having a broad molecular weight distribution suitable for a blow molding, a film molding and the like can also be obtained using a catalyst (silyl chromate catalyst) prepared by supporting bis (triphenylsilyl)chromate on an inorganic oxide solid such as silica and treating the same with an organoaluminum as disclosed in, for example, JP-B-44-2996, JP-B-44-3827 and JP-B-47-1766.

Thus, chromium catalysts have conventionally been used industrially as a catalyst for producing an ethylene polymer having high molecular weight, which is suitable for a blow molding or a film molding.

However, in the use of those catalysts, even if polymerization temperature is elevated as high as possible or a chain transfer agent such as hydrogen is used, in a process of a slurry polymerization in which the ethylene polymer does not dissolve in a polymerization solvent or a gas phase polymerization, it is still difficult to produce an ethylene polymer having low molecular weight suitable for an injection molding.

Improvement methods of Phillips catalyst for obtaining an ethylene polymer having low molecular weight have been proposed as disclosed in, for example, U.S. Pat. No. 4,248,735, U.S. Pat. No. 4,177,162, U.S. Pat. No. 4,151,122, U.S. Pat. No. 4,312,967, U.S. Pat. No. 4,397,765, U.S. Pat. No. 4,364,839 and U.S. Pat. No. 4,364,842. However, it cannot say that the molecular weigh can sufficiently be decreased by those methods. Thus, there has been a limit for the molecular weight of an ethylene polymer that can be produced by those catalysts.

On the other hand, according to the use of a chromocene catalyst comprising bis(cyclopentadienyl)chromium(II) supported on silica or the like as described before, an ethylene polymer having a very wide molecular weight range of from high molecular weight to low molecular weight can be obtained by using hydrogen as a chain transfer agent. However, use of the chromocene catalyst has a great disadvantage that since α-olefin such as 1-butene or 1-hexene is not copolymerized, it is impossible to control a density of the ethylene polymer and only a product having very limited high density can be obtained. Therefore, if a chromium catalyst which can provide an ethylene polymer having low molecular weight and can control a density thereof in a wide range is obtained, the range of an ethylene polymer which can be produced by a chromium catalyst can be expanded, making it possible to produce products having industrial characteristics.

Further high quality is demanded for an ethylene polymer suitable for use in a blow molding or a film molding. In particular, in the case of producing a blow molded product using an ethylene polymer having a broad molecular weight distribution obtained using Phillips catalyst or silyl chromate catalyst, such a molded product is not always satisfied with either of the following points:

(1) Balance between rigidity and environmental stress crack resistance (ESCR) is not sufficient; and
(2) Since melt tension is not sufficient in molding, ununiformity occurs in the thickness of a blow molded product, and also the surface of a molded product roughens, which is undesirable on appearance.

In order to solve these problems, it is necessary to further broaden the molecular weight distribution.

As is known well, Ziegler catalyst enables the molecular weight to be easily controlled with hydrogen and can produce an ethylene polymer having a wide molecular weight range of from low molecular weight to high molecular weight, and use of Ziegler catalyst in a multi-stage polymerization using at least two reactors connected one after another enables the production of an ethylene polymer having a broad molecular weight distribution by, for example, producing a high molecular weight component in a first-stage reactor and then a low molecular weight component in a second-stage reactor as disclosed in, for example, JP-B-3-18645. However, the ethylene polymer by a multistage polymerization using Ziegler catalyst can improve balance between rigidity and ESCR, but melt tension of such a polymer is not comparable to that of an ethylene polymer obtained using Phillips catalyst or silyl chromate catalyst and thus moldability is poor. Therefore, if there is a chromium catalyst that can produce an ethylene polymer having a broad molecular weight range by a multistage polymerization, the problem on moldability can be solved. A process for producing an ethylene polymer by a two-stage polymerization using Phillips catalyst is disclosed in, for example, EP-A-905145 and EP-A-905146. However, such Phillips catalyst cannot produce a component having low molecular weight and there is a limit in broadening a molecular weight distribution as described above. Further, U.S. Pat. No. 5,478,898 discloses a process for conducting a two-stage polymerization using chromocene catalyst. This catalyst makes it possible to obtain an ethylene polymer having a very broad molecular weight distribution of from high molecular weight to low molecular weight by using hydrogen as a chain transfer agent and thus a molecular weight distribution can be broadened, as described before. However, since use of the chromocene catalyst does not enable α-olefin such as 1-butene or 1-hexene to copolymerize, it is impossible to control a density of the ethylene polymer and only a product having high density is obtained. Thus it cannot be said that this is an industrially useful process. Therefore, if a chromium catalyst that can greatly broaden a molecular weight distribution by a multistage polymerization and can control a density in a wide range is obtained, it is possible to produce an industrially useful ethylene polymer suitable for used in blow molding or film molding.

A method of using a catalyst comprising two kinds of organochromium compounds supported on an inorganic oxide solid such as silica is known as a method of broadening a molecular weight distribution by using chromium catalyst. For example, U.S. Pat. No. 5,169,816 discloses a catalyst comprising bis-(cyclopentadienyl)chromium(II) and (pentamethylcyclopentadienyl)(2-methylpentadienyl) chromium(II) supported on silica. According to the use of this catalyst, a molecular weight distribution of an ethylene polymer obtained broadens as compared with the case of using each organochromium compound alone. However, a high molecular weight component formed by (pentamethylcyclopentadienyl)(2-methylpentadienyl) chromium(II) does not copolymerize with α-olefin such as 1-butene or 1-hexene and as a result, balance between rigidity and ESCR is poor. Further, melt tension is not also sufficient.

U.S. Pat. No. 5,723,399 discloses a catalyst comprising a chromium compound such as chromium-carboxylic acid salt, chromium-1,3-diketo compound, chromic acid ester or chromium-amide compound, a carrier, aluminoxane and a transition metal compound having a group having a conjugated π-electron as a ligand. A molecular weight distribution of an ethylene polymer obtained using this catalyst broadens as compared with the case of using each transition metal component alone. However, α-olefin such as 1-butene or 1-hexene is difficult to be copolymerized with a high molecular weight component formed by using the chromium compound and thus further improvement in balance between rigidity and ESCR is required.

JPA-A-10-338707 discloses a catalyst comprising two kinds of chromium compounds selected from chromium-carboxylic acid salt, chromium-1,3-diketo compound, chromic acid ester and chromium-amide compound, a carrier, aluminoxane and organic metal alkoxide and/or organic metal siloxide. A molecular weight distribution of an ethylene polymer obtained using this catalyst broadens as compared with the case of using each chromium compound alone. However, α-olefin such as 1-butene or 1-hexene is difficult to be copolymerized with a high molecular weight component formed by using the chromium compound, and thus further improvement in balance between rigidity and ESCR is required.

Therefore, a second object of the present invention is to provide a novel catalyst for the production of an ethylene polymer, which overcomes the conventional problems in the chromium catalyst, and a process for efficiently producing an ethylene polymer having low molecular weight and narrow molecular weight distribution suitable for use in injection molding or an ethylene polymer having broad molecular weight distribution, excellent balance between rigidity and ESCR and excellent moldability suitable for use in blow molding or film molding, using the catalyst.

SUMMARY OF THE INVENTION

The inventors of the present invention have made intensive investigations in view of the above-described problems inherent in the prior art. As a result, it has been found that a catalyst comprising a specific trivalent alkyl chromium compound and an inorganic oxide solid, or a catalyst comprising a specific trivalent alkyl chromium compound, an inorganic oxide solid and an organoaluminum compound does not cause deterioration with the passage of time and can be used as a catalyst having improved activity for the production of an ethylene polymer which is copolymerizable with α-olefin, thereby an ethylene polymer having excellent impact resistance is obtained.

It has also been found that if a specific tetravalent alkyl chromium compound is used together with the specific trivalent alkyl chromium compound and a catalyst comprising those compounds supported on an inorganic oxide solid is used, an ethylene polymer obtained has low molecular weight and also narrow molecular weight distribution as compared with the case of using a catalyst comprising a trivalent or tetravalent alkyl chromium compound and an inorganic oxide solid, under the same polymerization conditions. The present invention has been completed based on those findings.

The present invention provides the following catalyst for the production of an ethylene polymer and a process for producing an ethylene polymer:

1) A catalyst for the production of an ethylene polymer, comprising:
   a trivalent alkyl chromium compound represented by the following formula (1):

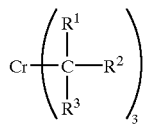
(1)

wherein $R^1$, $R^2$ and $R^3$ which may be the same or different each represent hydrogen atom, an alkyl group having 1 to 18 carbon atoms, an aryl group having 6 to 18 carbon atoms or a silyl group substituted with an alkyl group having 1 to 18 carbon atoms or an aryl group having 6 to 18 carbon atoms, provided that $R^1$, $R^2$ and $R^3$ are not simultaneously hydrogen atom; and two of $R^1$, $R^2$ and $R^3$ may be connected to form a ring, and an inorganic oxide solid.

2) The catalyst for the production of an ethylene polymer as described in item 1) above, which is obtained by supporting the trivalent alkyl chromium compound represented by the formula (1) on the inorganic oxide solid.

3) The catalyst for the production of an ethylene polymer as described in item 2) above, which is obtained by supporting the trivalent alkyl chromium compound represented by the formula (1) in an amount of 0.01 to 10% in terms of chromium atom to the inorganic oxide solid, on the inorganic oxide solid.

4) The catalyst for the production of an ethylene polymer as described in item 1) above, wherein the trivalent alkyl chromium compound represented by the formula (1) is a trivalent alkyl chromium compound represented by the following formula (3):

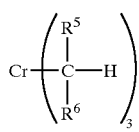
(3)

wherein $R^5$ and $R^6$ which may be the same or different each represent hydrogen atom, an alkyl group having 1 to 18 carbon atoms, an aryl group having 6 to 18 carbon atoms or a silyl group substituted with an alkyl group having 1 to 18 carbon atoms or an aryl group having 6 to 18 carbon atoms, provided that $R^5$ and $R^6$ are not simultaneously hydrogen atom; and $R^5$ and $R^6$ may be connected to form a ring.

5) The catalyst for the production of an ethylene polymer as described in item 4) above, wherein the trivalent alkyl chromium compound represented by the formula (3) is a trivalent alkyl chromium compound represented by the following formula (4):

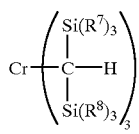
(4)

wherein $R^7$ and $R^8$ which may be the same or different each represent an alkyl group having 1 to 18 carbon atoms or an aryl group having 6 to 18 carbon atoms; and $R^7$ and $R^8$ may be connected to form a ring.

6) A catalyst for the production of an ethylene polymer, comprising a trivalent alkyl chromium compound represented by the following formula (1):

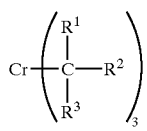
(1)

wherein $R^1$, $R^2$ and $R^3$ are the same as defined above, an inorganic oxide solid, and an organoaluminum compound represented by the following formula (2):

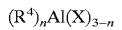
(2)

wherein a plurality of $R^4$ which may be the same or different each represent an alkyl group having 1 to 18 carbon atoms, a plurality of X which may be the same or different each represent a halogen atom, an alkoxyl group, siloxy group or hydrogen atom and n is an integer of 1 to 3.

7) The catalyst for the production of an ethylene polymer as described in item 6) above, which is obtained by supporting the trivalent alkyl chromium compound represented by the formula (1) on the inorganic oxide solid and then reacting the solid catalyst component obtained with the organoaluminum compound represented by the formula (2).

8) The catalyst for the production of an ethylene polymer as described in item 7) above, which is obtained by supporting the trivalent alkyl chromium compound represented by the formula (1) in an amount of 0.01 to 10% in terms of chromium atom to the inorganic oxide solid, on the inorganic oxide solid and then reacting the solid catalyst component obtained with the organoaluminum compound represented by the formula (2) in the proportion such that a molar ratio of aluminum atom/chromium atom is 1 to 1000.

9) The catalyst for the production of an ethylene polymer as described in item 6) above, wherein the trivalent alkyl chromium compound represented by the formula (1) is a trivalent alkyl chromium compound represented by the following formula (3):

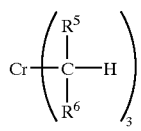

(3)

wherein $R^5$ and $R^6$ are the same as defined in item 4) above.

10) The catalyst for the production of an ethylene polymer as described in item 9) above, wherein the trivalent alkyl chromium compound represented by the formula (3) is a trivalent alkyl chromium compound represented by the following formula (4):

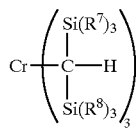

(4)

wherein $R^7$ and $R^8$ are the same as defined in item 5) above.

11) A catalyst for the production of an ethylene polymer, comprising a trivalent alkyl chromium compound represented by the following formula (1):

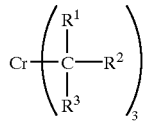

(1)

wherein $R^1$, $R^2$ and $R^3$ which may be the same or different each represent hydrogen atom, an alkyl group having 1 to 18 carbon atoms, an aryl group having 6 to 18 carbon atoms or a silyl group substituted with an alkyl group having 1 to 18 carbon atoms or an aryl group having 6 to 18 carbon atoms, provided that $R^1$, $R^2$ and $R^3$ are not simultaneously hydrogen atom; and at least two of $R^1$, $R^2$ and $R^3$ may be connected to form a ring, a tetravalent alkyl chromium compound represented by the following formula (5)

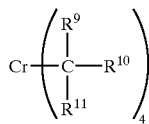

(5)

wherein $R^9$, $R^{10}$ and $R^{11}$ which may be the same or different each represent hydrogen atom, an alkyl group having 1 to 18 carbon atoms, an aryl group having 6 to 18 carbon atoms or a silyl group substituted with an alkyl group having 1 to 18 carbon atoms or an aryl group having 6 to 18 carbon atoms, provided that $R^9$, $R^{10}$ and $R^{11}$ are not simultaneously hydrogen atom; and at least two of $R^9$, $R^{10}$ and $R^{11}$ may be connected to form a ring, and an inorganic oxide solid.

12) The catalyst for the production of an ethylene polymer as described in item 11) above, wherein the trivalent alkyl chromium compound represented by the formula (1) and the tetravalent alkyl chromium compound represented by the formula (5) are supported on the inorganic oxide solid.

13) The catalyst for the production of an ethylene polymer as described in item 12) above, wherein the amount of the trivalent alkyl chromium compound represented by the formula (1) and the tetravalent alkyl chromium compound represented by the formula (5) supported on the inorganic oxide solid is 0.01 to 5% in terms of chromium atom to the inorganic oxide solid.

14) The catalyst for the production of an ethylene polymer as described in item 12) or 13) above, wherein the ratio of the trivalent alkyl chromium compound represented by the formula (1) and the tetravalent alkyl chromium compound represented by the formula (5) supported on the inorganic oxide solid is 1 to 99:99 to 1 in terms of mass ratio of chromium atom.

15) The catalyst for the production of an ethylene polymer as described in any one of items 11) to 14) above, wherein the inorganic oxide solid that has been calcined at 400 to 900° C. is used.

16) A process for producing an ethylene polymer, which comprising using the catalyst for the production of an ethylene polymer as described in any one of items 1) to 5) above.

17) A process for producing an ethylene polymer, which comprising using the catalyst for the production of an ethylene polymer as described in any one of items 6) to 10) above.

18) A process for producing an ethylene polymer, which comprising using the catalyst for the production of an ethylene polymer as described in any one of items 11) to 15) above.

19) The process for producing an ethylene polymer as described in item 18) above, which comprises conducting a multi-stage polymerization by connecting at least two reactors.

DETAILED DESCRIPTION OF THE INVENTION

Figure 1:
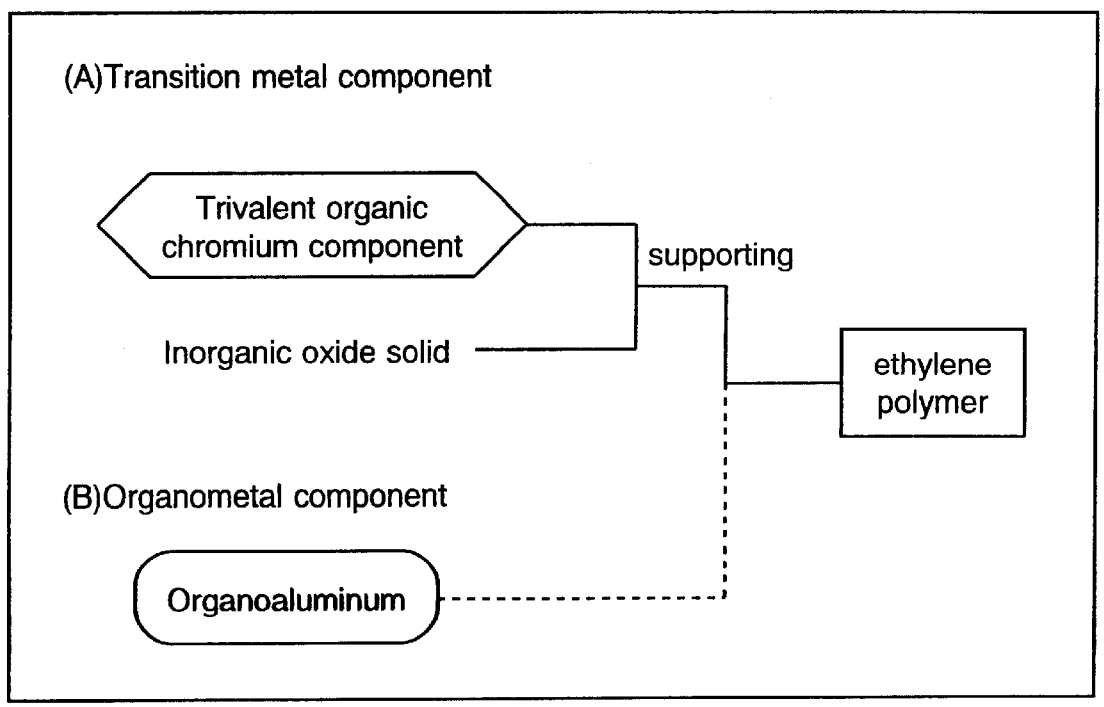
FIG. 1 is a flow chart showing preparation of a catalyst for the production of an ethylene polymer using a trivalent alkyl chromium compound according to the present invention.
Figure 2:
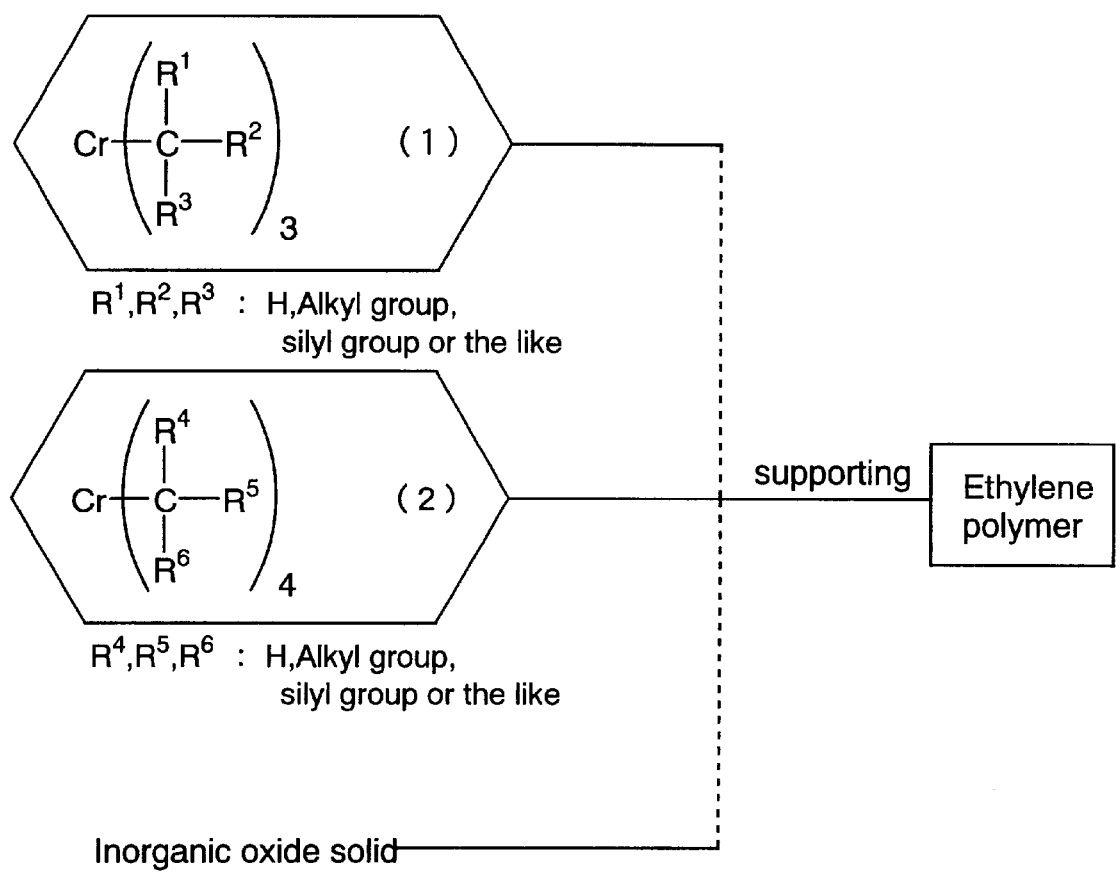
FIG. 2 is a flow chart showing preparation of a catalyst for the production of an ethylene polymer using a trivalent alkyl chromium compound and a tetravalent alkyl chromium compound according to the present invention.

The catalyst of the present invention is separately described with respect to (I) a catalyst comprising a specific trivalent alkyl chromium compound and an inorganic oxide solid, or comprising a specific trivalent alkyl chromium compound, an inorganic oxide solid and an organoaluminum compound (hereinafter sometimes referred to as a "first catalyst") and (II) a catalyst comprising a specific trivalent alkyl chromium compound, a specific tetravalent alkyl chromium compound and an inorganic oxide solid (hereinafter sometimes referred to as a "second catalyst").

(I) First catalyst (a catalyst comprising a trivalent alkyl chromium compound, an inorganic oxide solid and optionally an organic aluminum)

(1) Trivalent Alkyl Chromium Compound Represented by the Formula (1) Used in the First Catalyst of the Present Invention:

(1)

wherein $R^1$, $R^2$ and $R^3$ which may be the same or different each represent hydrogen atom, an alkyl group having 1 to 18 carbon atoms, an aryl group having 6 to 18 carbon atoms or a silyl group substituted with an alkyl group having 1 to 18 carbon atoms or an aryl group having 6 to 18 carbon atoms, provided that $R^1$, $R^2$ and $R^3$ are not simultaneously hydrogen atom; and two of $R^1$, $R^2$ and $R^3$ may be connected to form a ring.

Examples of the alkyl group in the definition of $R^1$, $R^2$ and $R^3$ include methyl, ethyl, n-propyl, i-propyl, n-butyl, t-butyl, cyclopentyl, cyclohexyl, benzyl, dimethylphenylmethyl, methyldiphenylmethyl and triphenylmethyl. Examples of the aryl group include phenyl, tolyl, xylyl, mesityl, naphthyl and indenyl. Examples of the alkyl-substituted silyl group include trimethylsilyl, triethylsilyl, triisopropylsilyl, tri(t-butyl)silyl and tricyclohexylsilyl. Examples of the aryl-substituted silyl group include triphenylsilyl, tritolylsilyl, trixylylsilyl, trimesitylsilyl, dimethylphenylsilyl and diphenylmethylsilyl. Where two of $R^1$, $R^2$ and $R^3$ are connected to form a ring, examples of such a ring include cyclopentyl, cyclohexyl, 2,2,5,5-tetramethyl-2,5-disilacyclopentyl and 2,2,6,6- tetramethyl-2,6-disilacyclohexyl.

Examples of the trivalent alkyl chromium compound represented by the formula (1) include tris[bis(alkyl)methyl]chromium(III), tris[bis(aryl)methyl]chromium(III), tris[bis(alkyl-substituted-silyl)methyl]chromium(III), tris[bis(aryl-substituted-silyl)methyl]chromium(III), tris[tris(aklyl)methyl]chromium(III), tris[tris(aryl)methyl]chromium(III), tris[tris(alkyl-substituted-silyl)methyl]chromium(III) and tris[tris(aryl-substituted-silyl)methyl]chromium(III).

Specific examples of the trivalent alkyl chromium compound represented by the formula (1) include:

tris[bis(trimethylsilyl)methyl]chromium(III), tris[tris(trimethylsilyl)methyl]chromium(III), tris[bis(triethylsilyl)methyl]chromium(III), tris[tris(triethylsilyl)methyl]chromium(III), tris[bis(tri(n-propyl)silyl)methyl]chromium(III), tris[tris(tri(n-propyl)silyl)methyl]chromium(III) tris[bis(triisopropylsilyl)methyl]chromium(III), tris[tris(triisopropylsilyl)methyl]chromium(III), tris[bis(tri(n-butyl)silyl)methyl]chromium(III), tris[tris(tri(n-butyl)silyl)methyl]chromium(III), tris[bis(triisobutylsilyl)methyl]chromium(III), tris[tris(triisobutylsilyl)methyl]chromium(III), tris[bis(tri(t-butyl)silyl)methyl]chromium(III), tris[tris(tri(t-butyl)silyl)methyl]chromium(III), tris[1,1-bis(trimethylsilyl)ethyl]chromium(III), tris[1,1-bis(trimethylsilyl)propyl]chromium(III), tris[1,1-bis(trimethylsilyl)-2-methylpropyl]chromium(III), tris[1,1-bis(trimethylsilyl)butyl]chromium(III), tris[{bis(trimethylsilyl)phenyl}methyl]chromium(III), tris[{bis(trimethylsilyl)cyclohexyl}methyl]chromium(III), tris[1,1-bis(triethylsilyl)ethyl]chromium(III), tris[1,1-bis(triethylsilyl)propyl]chromium(III), tris[1,1-bis(triethylsilyl)-2-methylpropyl]chromium(III), tris[1,1-bis(triethylsilyl)butyl]chromium(III), tris[{bis(triethylsilyl)phenyl}methyl]chromium(III), tris[{bis(triethylsilyl)cyclohexyl}methyl]chromium(III), tris[1,1-bis(tri(n-propyl)silyl)ethyl]chromium(III), tris[1,1-bis(tri(n-propyl)silyl)propyl]chromium(III), tris[1,1-bis(tri(n-propyl)silyl)-2-methylpropyl]chromium(III), tris[1,1-bis(tri(n-propyl)silyl)butyl]chromium(III), tris[bis(tri(n-propyl)silyl)phenylmethyl]chromium(III), tris[bis(tri(n-propyl)silyl)cyclohexylmethyl]chromium(III), tris[1,1-bis(triisopropylsilyl)ethyl]chromium(III), tris[1,1-bis(triisopropylsilyl)propyl]chromium(III), tris[1,1-bis(triisopropylsilyl)-2-methylpropyl]chromium(III), tris[1,1-bis(triisopropylsilyl)butyl]chromium(III), tris[{bis(triisopropylsilyl)phenyl}methyl]chromium(III), tris[{bis(triisopropylsilyl)cyclohexyl}methyl]chromium(III), tris(di(t-butyl)methyl)chromium(III), tris(tri(t-butyl)methyl)chromium(III), tris(di(t-heptyl)methyl)chromium(III) tris(tri(t-heptyl)methyl)chromium(III), tris(4,4,6,6,-tetra(n-propyl)-5-nonyl)chromium(III), tris(4,4,5,6,6,-penta(n-propyl)-5-nonyl)chromium(III), tris(2,6-dimethyl-3,5-diisopropyl)-4-heptyl)chromium(III), tris(2,6-dimethyl-3,4,5-triisopropyl)-4-heptyl)chromium(III), tris(2,2,3,5,5-pentamethyl-3-pentyl)chromium(III), tris(3-ethyl-2,2,5,5-tetramethyl-3-pentyl)chromium(III), tris(3-isopropyl-2,2,5,5-tetramethyl-3-pentyl)chromium(III), tris(3-n-propyl-2,2,5,5-tetramethyl-3-pentyl)chromium(III), tris(3-phenyl-2,2,5,5-tetramethyl-3-pentyl)chromium(III), tris(3-cyclohexyl-2,2,5,5-tetramethyl-3-pentyl)chromium(III), tris(4-methyl-2,2,5,5-tetraethyl-4-heptyl)chromium(III), tris(2,2,4,5,5-pentaethyl-4-heptyl)chromium(III), tris(4-isopropyl-2,2,5,5-tetraethyl-4-heptyl)chromium(III), tris(4-phenyl-2,2,5,5-tetraethyl-4-heptyl)chromium(III), tris(4-cyclohexyl-2,2,5,5-tetraethyl-4-heptyl)chromium(III), tris(1-phenylethyl)chromium(III), tris(1-tolylethyl)chromium(III), tris(1-xylylethyl)chromium(III), tris(1-mesitylethyl)chromium(III), tris(2-phenyl-2-propyl)chromium(III), tris(2-tolyl-2-propyl)chromium(III), tris(2-xylyl-2-propyl)chromium(III), tris(2-mesityl-2-propyl)chromium(III), tris(diphenylmethyl)chromium(III), tris(ditolylmethyl)chromium(III), tris(dixylylmethyl)chromium(III), tris(dimesitylmethyl)chromium(III), tris(1,1-diphenylethyl)chromium(III), tris(1,1-ditolylethyl)chromium(III), tris(1,1-dixylylethyl)chromium(III), tris(1,1-dimesitylethyl)chromium(III), tris(1-trimethylsilylcyclohexyl)chromium(III), tris(1-triethylsilylcyclohexyl)chromium(III), tris(1-tributylsilylcyclohexyl)chromium(III), tris(1-triphenylsilylcyclohexyl)chromium(III), tris(1-t-butylcyclohexyl)chromium(III), tris(1-triethylmethylcyclohexyl)chromium(III), tris(1-tributylmethylcyclohexyl)chromium(III), tris(1- triphenylmethylcyclohexyl)chromium(III), tris(1-trimethylsilylcyclopentyl)chromium(III), tris(1-triethylsilylcyclopentyl)chromium(III), tris(1-tributylsilylcyclopentyl)chromium(III), tris(1-triphenylsilylcyclopentyl)chromium(III), tris(1-t-butylcyclopentyl)chromium(III), tris(1-triethylmethylcyclopentyl)chromium(III), tris(1-tributylmethylcyclopentyl)chromium(III), tris(1-triphenylmethylcyclopentyl)chromium(III), tris(1-triphenylmethyl)chromium(III), tris(trimethylsilyldiphenylmethyl)chromium(III), tris(triethylsilyldiphenylmethyl)chromium(III), tris(tributylsilyldiphenylmethyl)chromium(III), tris(triphenylsilyldiphenylmethyl)chromium(III), tris(t-butyldiphenyl)chromium(III), tris(1,1-diphenyl-2,2-dimethyl-1-propyl)chromium(III), tris(1,1-diphenyl-2,2-diethyl-1-butyl)chromium(III), tris(1,1,2,2,2-pentaphenyl-1-ethyl)chromium(III), tris(bistrimethylsilylphenylmethyl)chromium(III), tris(bistriethylsilylphenylmethyl)chromium(III), tris(bistributylsilylphenylmethyl)chromium(III), tris(bistriphenylsilylphenylmethyl)chromium(III), tris(di(t-butyl)phenylmethyl)chromium(III), tris[bis(dimethylphenylsilyl)methyl]chromium(III), tris[tris(dimethylphenylsilyl)methyl]chromium(III), tris[bis(diphenylmethylsilyl)methyl]chromium(III), tris[tris(diphenylmethylsilyl)methyl]chromium(III), tris[bis(triphenylsilyl)methyl]chromium(III), tris[tris(triphenylsilyl)methyl]chromium(III), tris(2,2,5,5-tetramethyl-2,5-disilacyclopentyl)chromium(III), tris(2,2,6,6-tetramethyl-2,6-disilacyclohexyl)chromium(III).

Of these compounds preferably used are:

tris[bis(trimethylsilyl)methyl]chromium(III), tris[bis(triethylsilyl)methyl]chromium(III), tris[bis(tri(n-propyl)silyl)methyl]chromium(III), tris[bis(triisopropylsilyl)methyl]chromium(III), tris[bis(tri(n-butyl)silyl)methyl]chromium(III), tris[bis(triisobutylsilyl)methyl]chromium(III), tris[bis(tri(t-butyl)silyl)methyl]chromium(III), tris(di(t-butyl)methyl)chromium(III), tris(di(t-heptyl)methyl)chromium(III), tris(4,4,6,6-tetra(n-propyl)-5-nonyl)chromium(III), tris(2,6-dimethyl-3,5-diisopropyl-4-heptyl)chromium(III), tris(1-phenylethyl)chromium(III), tris(1-tolylethyl)chromium(III), tris(1-xylylethyl)chromium(III), tris(1-mesitylethyl)chromium(III), tris(diphenylmethyl)chromium(III), tris(ditolylmethyl)chromium(III), tris(dixylylmethyl)chromium(III), tris(dimesitylmethyl)chromium(III), tris[bis(dimethylphenylsilyl)methyl]chromium(III), tris[bis(diphenylmethylsilyl)methyl]chromium(III), tris[bis(triphenylsilyl)methyl]chromium(III), tris(2,2,5,5-tetramethyl-2,5-disilacyclopentyl)chromium(III) and tris(2,2,6,6-tetramethyl-2,6-disilacyclohexyl)chromium(III).

Of the above preferable compounds, compound more preferably used are:

tris[bis(trimethylsilyl)methyl]chromium(III), tris[bis(triethylsilyl)methyl]chromium(III), tris[bis(tri(n-propyl)silyl)methyl]chromium(III), tris[bis(triisopropylsilyl)methyl]chromium(III), tris[bis(tri(n-butyl)silyl)methyl]chromium(III), tris[bis(triisobutylsilyl)methyl]chromium(III), tris[bis(tri(t-butyl)silyl)methyl]chromium(III), tris[bis(dimethylphenylsilyl)methyl]chromium(III), tris[bis(diphenylmethylsilyl)methyl]chromium(III), tris[bis(triphenylsilyl)methyl]chromium(III), tris(2,2,5,5-tetramethyl-2,5-disilacyclopentyl)chromium(III) and tris(2,2,6,6-tetramethyl-2,6-disilacyclopentyl)chromium(III).

(2) Inorganic Oxide Solid

The inorganic oxide solid used in the first catalyst of the present invention is oxide of metals of Groups 2, 4, 13 or 14 in the Periodic Table. Examples of the inorganic oxide solid include magnesia, titania, zirconia, silica, alumina, silica-alumina, silica-titania, silica-zirconia and aluminum phosphate. Those materials can be used alone or as mixtures thereof. Aluminum phosphate is formally a phosphoric acid salt, but has properties as oxide. Of these, silica-alumina and silica are preferably used.

The inorganic oxide solids having the following properties are used.

Specific surface area: 50–1,000 $m^2/g$, preferably 200–800 $m^2/g$

Pore volume: 0.5–3.0 $cm^3/g$, preferably 0.7–2.5 $cm^3/g$

Average particle size: 10–200 $\mu m$ preferably 30–150 $\mu m$

Preferably adsorbed water is previously removed and the inorganic oxide solid is calcined prior to its use. The calcination of the inorganic oxide solid is generally conducted at a temperature range of 100 to 900° C., preferably 200 to 800° C., in the case that the catalyst and the organoaluminum are reacted as described in items 4) to 6) above, and at a temperature range of 400 to 900° C., preferably 450 to 850° C., more preferably 500 to 800° C., in the case that the catalyst and the organoaluminum are not reacted as described in items 1) to 3) above, for 30 minutes to 48 hours, preferably 2 to 36 hours, more preferably 5 to 24 hours in nitorgen gas flow dried by passing molecular sieves. The inorganic oxide solid is preferably dried in a fluidized state by supplying a sufficient amount of nitrogen gas. Further, a conventional method may be employed in combination, which comprises adding titanates, fluorine-containing salts or the like and calcining, thereby controlling the molecular weight distribution or copolymerizability of an ethylene polymer obtained.

(3) Preparation of Catalyst

The first catalyst of the present invention is prepared by chemically reacting the trivalent alkyl chromium compound and the inorganic oxide solid. Specifically, either of the following methods is employed.

(A) A method of supporting the trivalent alkyl chromium compound previously synthesized on the inorganic oxide solid to prepare a catalyst.

(B) A method of synthesizing the trivalent alkyl chromium compound in the presence of the inorganic oxide solid and then supporting the trivalent alkyl chromium compound thus synthesized on the inorganic oxide solid.

Method (A) is preferably employed.

Synthesis method of the trivalent alkyl chromium compound represented by the formula (1) in method (A) is generally that trihalogenated chromium such as chromium trichloride, or chromium trichloride/tetrahydrofuran complex, $CrCl_3.3THF$, is reacted with an alkyl alkali metal salt such as bis(trimethylsilyl)methyl lithium in a molar ratio of alkyl alkali metal/chromium=3 in an ether type solvent such as tetrahydrofuran. In this reaction, in the case of the reaction of, for example, chromium trichloride and bis(trimethylsilyl)methyl lithium, lithium chloride precipitates as a halogenated alkali metal. This precipitated salt is removed by filtration, followed by, for example, recrystallization to isolate the objective trivalent alkyl chromium compound. Without isolation, a product of the trivalent alkyl chromium compound may be obtained by removing the halogenated alkali metal, removing the ether type solvent under reduced pressure and dissolving in an inert hydrocarbon solvent such as pentane, hexane, heptane, decane, cyclohexane, benzene, toluene or xylene.

Supporting the trivalent alkyl chromium compound on the inorganic oxide solid is conducted in an inert hydrocarbon such as pentane, hexane, heptane, decane, cyclohexane, benzene, toluene or xylene. The amount of the solvent per the inorganic oxide solid can be an optional amount.

The amount of chromium atom supported to the inorganic oxide solid is 0.01 to 10%, preferably 0.03 to 5%. The reaction temperature is −78° C. to the boiling point of the solvent, preferably 20 to 60° C. The reaction time is 10 minutes to 48 hours, preferably 30 minutes to 24 hours.

After supporting and completion of the reaction, a catalyst having good flowability is obtained by a method of removing the solvent under reduced pressure or a method of separating the catalyst by filtration.

(4) Organoaluminum Compound

In the present invention, the catalyst obtained above may be reacted with an organoaluminum compound represented by the following formula (2):

$$(R^4)_n Al(X)_{3-n} \quad (2)$$

wherein $R^4$ which may be the same or different each represent an alkyl group having 1 to 18 carbon atoms, X which may be the same or different each represent a halogen atom, an alkoxyl group, siloxy group or hydrogen atom and n is an integer of 1 to 3.

Examples of the organoaluminum compound represented by the formula (2) include trialkyl aluminum, dialkyl aluminum halide, dialkyl aluminum alkoxide, alkyl aluminum dihalide, alkyl aluminum dialkoxide, dialkyl aluminum hydride and siloxyalun.

Examples of the trialkyl aluminum include trimethyl aluminum, triethyl aluminum, tri n-butyl aluminum, triisobutyl aluminum, trihexyl aluminum and trioctyl aluminum. Of these, trimethyl aluminum, triethyl aluminum and triisobutyl aluminum are preferable.

Examples of the dialkyl aluminum halide include dimethyl aluminum chloride, diethyl aluminum chloride and diisobutyl aluminum chloride. Of these, diethyl aluminum chloride is preferable.

Examples of the dialkyl aluminum alkoxide include dimethyl aluminum methoxide, dimethyl aluminum ethoxide, dimethyl aluminum isopropoxide, dimethyl aluminum n-butoxide, dimethyl aluminum isobutoxide, diethyl aluminum ethoxide, diethyl aluminum isopropoxide, diethyl aluminum n-butoxide, diethyl aluminum isobutoxide, diisobutyl aluminum ethoxide, diisobutyl aluminum isopropoxide, diisobutyl aluminum n-butoxide, diisobutyl aluminum isobutoxide, di n-hexyl aluminum ethoxide, di n-hexyl aluminum isopropoxide, di n-hexyl aluminum n-butoxide and di n-hexyl aluminum isopropoxide. Of these, diethyl aluminum ethoxide is preferable.

Examples of the alkyl aluminum dihalide include methyl aluminum dichloride, ethyl aluminum dichloride and isobutyl aluminum dichloride. Of these, ethyl aluminum dichloride is preferable.

Examples of the alkyl aluminum dialkoxide include methyl aluminum dimethoxide, methyl aluminum diethoxide, methyl aluminum diisopropoxide, methyl aluminum di n-butoxide, methyl aluminum diisobutoxide, ethyl aluminum diethoxide, ethyl aluminum diisopropoxide, ethyl aluminum di n-butoxide, ethyl aluminum diisobutoxide, isobutyl aluminum diethoxide, isobutyl aluminum disopropoxide, isobutyl aluminum di n-butoxide, isobutyl aluminum diisobutoxide, n-hexyl aluminum diethoxide, n-hexyl aluminum diisopropoxide, n-hexyl aluminum di n-butoxide and n-hexyl aluminum diisobutoxide. Among these, ethyl aluminum diethoxide is preferable.

Examples of the dialkyl aluminum hydride include dimethyl aluminum hydride, diethyl aluminum hydride, di n-butyl aluminum hydride, diisobutyl aluminum hydride and di n-hexyl aluminum hydride. Of these, diethylaluminum hydride is preferable.

A method of reacting the organoaluminum compound with a catalyst comprising the trivalent alkyl chromium compound supported on the inorganic oxide solid is preferably (C) a method of supporting the organoaluminum compound on the catalyst, or (D) a method of contacting the organoaluminum compound during polymerization in the presence or absence of a monomer.

The amount of the organoaluminum compound supported or contacted during polymerization is an amount such that a molar ratio of aluminum atom to chromium atom is 1 to 1,000, preferably 5 to 300.

In the case of supporting the organoaluminum compound, it is conducted in an inert hydrocarbon such as pentane, hexane, heptane, decane, cyclohexane, benzene, toluene or xylene. The amount of the solvent used per catalyst can be an optional amount. The supporting reaction temperature is −78° C. to the boiling point of the solvent, preferably −20 to 60° C. The reaction time is 10 minutes to 48 hours, preferably 30 minutes to 24 hours. After the supporting reaction, a dry powder having good flowability can be obtained by a method of removing the solvent under reduced pressure or a method of separating the catalyst by filtration and then used for polymerization. Alternatively, the catalyst obtained can directly be introduced into a polymerization reactor without removing the solvent.

(5) Process for Producing Ethylene Polymer

Production of the ethylene polymer using the catalyst of the present invention can be conducted by, for example, a liquid phase polymerization method such as slurry polymerization or solution polymerization, or a gas phase polymerization method. The liquid phase polymerization method is generally conducted in a hydrocarbon solvent. Examples of the hydrocarbon solvent include propane, butane, isobutane, hexane, heptane, cyclohexane, benzene, toluene and xylene. Those can be used alone or as mixtures of two or more thereof. The gas phase polymerization method can employ the conventional polymerization method such as fluidized bed or stirring bed, in the co-presence of an inert gas. Occasionally, a so-called condensing mode in which a medium for removing polymerization heat is present together can be employed. The polymerization temperature in the liquid phase or gas phase polymerization is generally 0 to 300° C., practically 20 to 200° C. The catalyst concentration and the pressure in the reactor can be optional so long as such are sufficient to proceed polymerization. Further, hydrogen or the like can be present together for controlling molecular weight.

If required and necessary, copolymerization can be conducted by introducing at least one kind of α-olefin such as propylene, 1-butene, 1-hexene, 4-methyl-1-pentene or 1-octene, together with ethylene. Further, not only a single stage polymerization using one reactor to produce an ethylene polymer but a multi-stage polymerization by connecting at least two reactor for broadening molecular weight distribution can be conducted.

By practicing the process of the present invention, an ethylene polymer can efficiently be obtained by the catalyst which does not cause deterioration with the passage of time, has high activity and uses the trivalent alkyl chromium compound copolymerizable with α-olefin.

(II) Second catalyst (catalyst comprising trivalent alkyl chromium compound, tetravalent alkyl chromium compound and inorganic oxide solid)

(1) The first catalyst component used in the second catalyst of the present invention is a trivalent alkyl chromium compound represented by the formula (1) described before.

Each of $R^1$, $R^2$ and $R^3$ in the formula (1) may be in a linear structure such as an alkyl group or an alkyl-substituted silyl group and they may also form a ring structure such as cyclohexyl or an alkyl-substituted cyclohexyl in which two of $R^1$, $R^2$ and $R^3$ are connected as in the first catalyst of the present invention. In addition to these structures, $R^1$, $R^2$ and $R^3$ may form a bicyclo-type ring structure in which each of $R^1$, $R^2$ and $R^3$ is a member of the ring in the second catalyst of the present invention. Examples of such a bicyclo-type ring structure include 1-bicyclo-[2,2,1]-heptyl and alkyl-substituted 1-bicyclo-[2,2,1]-heptyl.

Of these substituents, an alkyl group, an alkyl-substituted silyl group, 1-bicyclo-[2,2,1]-heptyl and alkyl-substituted 1-bicyclo-[2,2,1]-heptyl are preferable. In particular, t-butyl, dimethylphenylmethyl, trimethylsilyl, 1-bicyclo-[2,2,1]-heptyl and 2,2,3-trimethyl-1-bicyclo-[2,2,1]-heptyl are more preferable.

Examples of the trivalent alkyl chromium compound include those compounds listed in the first catalyst and tris(1-bicyclo-[2,2,1]-heptyl)chromium(III) and tris(alkyl-substituted-1-bicyclo-[2,2,1]-heptyl)chromium(III).

Examples of tris(alkyl-substituted 1-bicyclo-[2,2,1]-heptyl)chromium(III) include:

tris(2,2-dimethyl-1-bicyclo-[2,2,1]-heptyl)chromium (III), tris(2,6-dimethyl-1-bicyclo-[2,2,1]-heptyl)chromium(III), tris(2,2,3-trimethyl-1-bicyclo-[2,2,1]-heptyl)chromium(III), tris(2,2,4-trimethyl-1-bicyclo-[2,2,1]-heptyl)chromium(III), tris(2,2,5-trimethyl-1-bicyclo-[2,2,1]-heptyl)chromium(III), tris(2,3,6-trimethyl-1-bicyclo-[2,2,1]-heptyl)chromium(III), tris(2,4,6-trimethyl-1-bicyclo-[2,2,1]-heptyl)chromium (III), tris(2,2,3,5-tetramethyl-1-bicyclo-[2,2,1]-heptyl)chromium(III), tris(2,2,3,4-tetramethyl-1-bicyclo-[2,2,1]-heptyl)chromium(III), tris(2,3,3,6-tetramethyl-1-bicyclo-[2,2,1]-heptyl)chromium(III), tris(2,3,4,6-tetramethyl-1-bicyclo-[2,2,1]-heptyl)chromium(III) and tris(2,3,5,6-tetramethyl-1-bicyclo-[2,2,1]-heptyl)chromium(III).

Tris[bis(trimethylsilyl)methyl]chromium(III) and tris(2,2,3-trimethyl-1-bicyclo-[2,2,1]-heptyl)chromium(III) are preferable trivalent alkyl chromium compounds.

(2) The second catalyst component used in the second catalyst of the present invention is a tetravalent alkyl chromium compound represented by the following formula (5)

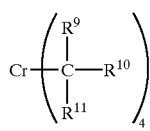

(5)

wherein $R^9$, $R^{10}$ and $R^{11}$ which may be the same or different each represent hydrogen atom, an alkyl group having 1 to 18 carbon atoms, an aryl group having 6 to 18 carbon atoms or a silyl group substituted with an alkyl group having 1 to 18 carbon atoms or an aryl group having 6 to 18 carbon atoms, provided that $R^9$, $R^{10}$ and $R^{11}$ are not simultaneously hydrogen atom; and at least two of $R^9$, $R^{10}$ and $R^{11}$ may be connected to form a ring.

Examples of the alkyl group in the definition of $R^9$, $R^{10}$ and $R^{11}$ include methyl, ethyl, n-propyl, isopropyl, n-butyl, isobutyl, t-butyl, cyclopentyl, cyclohexyl, benzyl, dimethylphenylmethyl and triphenylmethyl. Examples of the aryl groups in the definition of $R^9$, $R^{10}$ and $R^{11}$ include phenyl, tolyl, xylyl, mesityl, naphthyl, indenyl and fluorenyl. Examples of the alkyl-substituted silyl group in the definition of $R^9$, $R^{10}$ and $R^{11}$ include trimethylsilyl, triethylsilyl, triisopropylsilyl, tri t-butylsilyl and tricyclohexylsilyl. The aryl-substituted silyl group in the definition of $R^9$, $R^{10}$ and $R^{11}$ include triphenylsilyl, tritolylsilyl, trixylylsilyl, trimesitylsilyl, dimethylphenylsilyl, diphenylmethylsilyl, diethylphenyl silyl and diphenylethylsilyl. Examples of the ring formed by connecting at least two of $R^9$, $R^{10}$ and $R^{11}$ include cyclohexyl, alkyl-substituted cyclohexyl, 1-bicyclo [2,2,1]-heptyl and alkyl-substituted 1-bicyclo[2,2,1]-heptyl.

Among these, alkyl group, alkyl-substituted silyl group, 1-bicyclo[2,2,1]-heptyl and alkyl-substituted 1-bicyclo[2,2,1]-heptyl are preferable, and t-butyl, dimethylphenylmethyl, trimethylsilyl, 1-bicyclo[2,2,1]-heptyl and 2,2,3-trimethyl-1-bicyclo-[2,2,1]-heptyl are more preferable.

Examples of the tetravalent alkyl chromium compound represented by the formula (5) include tetrakis(alkyl)chromium(IV), tetrakis(aryl)chromium(IV), tetrakis(alkyl-substituted-silyl)chromium(IV), tetrakis(aryl-substituted-silyl)chromium(IV), tetrakis(1-bicyclo[2,2,1]-heptyl)chromium(IV) and tetrakis(alkyl-substituted 1-bicyclo[2,2,1]-heptyl)chromium(IV).

Further examples include:

tetrakis(2,2-dimethylpropyl)chromium(IV), tetrakis(2,2-dimethylbutyl)chromium(IV), tetrakis(2-methyl-2-phenylpropyl)chromium(IV), tetrakis(2,2-diphenylpropyl)chromium(IV), tetrakis(2,2,2-triphenylethyl)chromium(IV), tetrakis(benzyl)chromium(IV), tetrakis(trimethylsilylmethyl)chromium(IV), tetrakis(triethylsilylmethyl)chromium (IV), tetrakis(triphenylsilylmethyl)chromium(IV), tetrakis(cyclohexyl)chromium(IV), tetrakis(1-bicyclo-[2,2,1]-heptyl)chromium(IV), tetrakis(2-methyl-1-bicyclo-[2,2,1]-heptyl)chromium(IV), tetrakis(3-methyl-1-bicyclo-[2,2,1]-heptyl)chromium(IV), tetrakis(4-methyl-1-bicyclo-[2,2,1]-heptyl)chromium (IV), tetrakis(7-methyl-1-bicyclo-[2,2,1]-heptyl)chromium(IV), tetrakis(2,3,4-trimethyl-1-bicyclo-[2,2,1]-heptyl)chromium(IV), tetrakis(2,3,5-trimethyl-1-bicyclo-[2,2,1]-heptyl)chromium(IV), tetrakis(2,3-dimethyl-1-bicyclo-[2,2,1]-heptyl)chromium(IV), tetrakis(2,4-dimethyl-1-bicyclo-[2,2,1]-heptyl)chromium(IV), tetrakis(2,5-dimethyl-1-bicyclo-[2,2,1]-heptyl)chromium(IV), tetrakis(3,3-dimethyl-1-bicyclo-[2,2,1]-heptyl)chromium(IV), tetrakis(3,4-dimethyl-1-bicyclo-[2,2,1]-heptyl)chromium(IV), tetrakis(3,5-dimethyl-1-bicyclo-[2,2,1]-heptyl)chromium(IV), tetrakis(3,7-dimethyl-1-bicyclo-[2,2,1]-heptyl)chromium(IV), tetrakis(4,7-dimetyl-1-bicyclo-[2,2,1]-heptyl)chromium(IV), tetrakis(2,3,3-trimethyl-1-bicyclo-[2,2,1]-heptyl)chromium(IV), tetrakis(2,5,5-trimethyl-1-bicyclo-[2,2,1]-heptyl)chromium(IV), tetrakis(3,3,7-trimethyl-1-bicyclo-[2,2,1]-heptyl)chromium(IV), tetrakis(3,4,6-trimethyl-1-bicyclo-[2,2,1]-heptyl)chromium(IV) and tetrakis(3,4,7-trimethyl-1-bicyclo-[2,2,1]-heptyl)chromium(IV).

Among these, preferable compounds are:
tetrakis(2,2-dimethylpropyl)chromium(IV), tetrakis(2-methyl-2-phenylpropyl)chromium(IV), tetrakis(2,2,2- triphenylethyl)chromium(IV), tetrakis (trimethylsilylmethyl)chromium(IV), tetrakis (cyclohexyl)chromium(IV) and tetrakis(1-bicyclo-[2,2,1]-heptyl)chromium(IV).

(3) The third catalyst component used in the second catalyst of the present invention is an inorganic oxide solid. The inorganic oxide solid is oxide of metals of Groups 2, 4, 13 or 14 in the Periodic Table as mentioned in the first catalyst. Examples of the inorganic oxide solid include magnesia, titania, zirconia, silica, alumina, silica-alumina, silica-titania, silica-zirconia and aluminum phosphate. Those can be used alone or mixtures of two or more thereof. Aluminum phosphate is formally a phosphoric acid salt, but has properties as oxide. Of these, silica-alumina and silica are preferably used.

The inorganic oxide solids having the following properties are used.

Specific surface area: 50–1,000 m$^2$/g, preferably 200–800 m$^2$/g

Pore volume: 0.5–3.0 cm$^3$/g, preferably 0.7–2.5 cm$^3$/g

Average particle size: 10–200 am, preferably 30–150 $\mu$m

Preferably adsorbed water is previously removed and the inorganic oxide solid is calcined prior to its use. The calcination of the inorganic oxide solid is generally conducted at a temperature range of 400 to 900° C., preferably 450 to 850° C., more preferably 500 to 800° C., for 30 minutes to 48 hours, preferably 2 to 36 hours, more preferably 5 to 24 hours, in nitrogen gas flow dried by passing molecular sieves. If the calcination temperature is less than 400° C. or exceeds 900° C., the activity undesirably lowers. The inorganic oxide solid is preferably dried in a fluidized state by supplying a sufficient amount of nitrogen gas. Further, a conventional method may be employed in combination, which comprises adding titanates or fluorine-containing salts.

(4) Preparation of Catalyst

The second catalyst of the present invention is prepared by chemically reacting the trivalent alkyl chromium compound represented by the formula (1) and the tetravalent alkyl chromium compound represented by the formula (5) which have been previously synthesized, with the inorganic oxide solid, thereby supporting those compounds on the inorganic oxide solid. Surprisingly, it has been found that use of the catalyst of the present invention having both the trivalent alkyl chromium compound represented by the formula (1) and the tetravalent alkyl chromium compound represented by the formula (5) supported on the inorganic oxide solid provides an ethylene polymer having low molecular weight and narrow molecular weight distribution as compared with use of the catalyst having the trivalent alkyl chromium compound represented by the formula (1) or the tetravalent alkyl chromium compound represented by the formula (5) alone supported on the inorganic oxide solid, under the same polymerization conditions.

Synthesis method of the trivalent alkyl chromium compound represented by the formula (1) is generally that trihalogenated chromium such as chromium trichloride, or chromium trichloride/tetrahydrofuran complex, CrCl$_3$.3THF, is reacted with an alkyl alkali metal salt such as bis(trimethylsilyl)methyl lithium in a molar ratio of alkyl alkali metal/chromium=3 in an ether type solvent such as tetrahydrofuran. In this reaction, in the case of the reaction of, for example, chromium trichloride and bis(trimethylsilyl)methyl lithium, lithium chloride precipitates as a halogenated alkali metal. This precipitated salt is removed by filtration, followed by, for example, recrystallization to isolate the objective trivalent alkyl chromium compound. Without isolation, a product of the trivalent alkyl chromium compound may be obtained by removing the halogenated alkali metal, removing the ether type solvent under reduced pressure and dissolving in an inert hydrocarbon solvent such as pentane, hexane, heptane, decane, cyclohexane, benzene, toluene or xylene.

Synthesis method of the tetravalent alkyl chromium compound represented by the formula (5) is generally that trihalogenated chromium such as chromium trichloride, or chromium trichloride/tetrahydrofuran complex, CrCl$_3$.3THF, is reacted with a Grignard compound such as alkyl magnesium halide or an alkyl lithium compound in a molar ratio of a Grignard compound or alkyl lithium compound/chromium=4 to 5 in an ether type solvent such as diethyl ether or tetrahydrofuran. In this reaction, in the case of the reaction of, for example, CrCl$_3$.3THF and 2,2-dimethylpropyl magnesium chloride, magnesium chloride precipitates. This precipitated salt is removed by filtration, followed by, for example, recrystallization to isolate the objective tetravalent alkyl chromium compound. Without isolation, a product of the tetravalent alkyl chromium compound may be obtained by removing the ether type solvent under reduced pressure and dissolving in an inert hydrocarbon solvent such as pentane, hexane, heptane, decane, cyclohexane, benzene, toluene or xylene.

Supporting the trivalent alkyl chromium compound represented by the formula (1) and the tetravalent alkyl chromium compound represented by the formula (5) on the inorganic oxide solid is conducted in an inert hydrocarbon such as pentane, hexane, heptane, decane, cyclohexane, benzene, toluene or xylene. The amount of the solvent per the inorganic oxide solid can be an optional amount. The order for supporting those compounds on the inorganic oxide solid is optional. For example, the following methods can be either employed.

(i) A method of supporting the trivalent alkyl chromium compound represented by the formula (1) and then supporting the tetravalent alkyl chromium compound represented by the formula (5);

(ii) A method of supporting the tetravalent alkyl chromium compound represented by the formula (5) and then supporting the trivalent alkyl chromium compound represented by the formula (1); and (iii) A method of previously mixing the trivalent alkyl chromium compound represented by the formula (1) and the tetravalent alkyl chromium compound represented by the formula (5) in the presence or absence of a solvent and then supporting the resulting mixture.

The amount of each of the trivalent alkyl chromium compound represented by the formula (1) and the tetravalent alkyl chromium compound represented by the formula (5) supported is 0.01 to 5%, preferably 0.05 to 3%, more preferably 0.1 to 2%, in terms of chromium atom to the inorganic oxide solid. Further, the ratio of trivalent alkyl chromium compound represented by the formula (1) and the tetravalent alkyl chromium compound represented by the formula (5) supported is 1 to 99, preferably 20 to 80, more preferably 30 to 70, in terms of mass ratio of chromium atom. The supporting temperature is −78 to 100° C., preferably −20 to 80° C., more preferably 0 to 60° C. The supporting time is 10 minutes to 48 hours, preferably 30 minutes to 24 hours, more preferably 1 to 10 hours.

After supporting, a catalyst is obtained by a method of removing the solvent under reduced pressure or a method of separating the catalyst by filtration as a dry powder having good flowability and can be used for polymerization. Alternatively, the catalyst obtained can be directly introduced into a polymerization reactor without removing the solvent.

(5) Process for Producing Ethylene Polymer

In conducting the production of the ethylene polymer using the catalyst of the present invention, a liquid phase polymerization method such as slurry polymerization or solution polymerization, or a gas phase polymerization method can be employed.

The liquid phase polymerization method is generally conducted in a hydrocarbon solvent. Examples of the hydrocarbon solvent include inert hydrocarbons such as propane, butane, isobutane, hexane, heptane, cyclohexane, benzene, toluene and xylene. Those can be used alone or as mixtures of two or more thereof.

The gas phase polymerization method can employ the conventional polymerization method such as fluidized bed or stirring bed, in the co-presence of an inert gas. Occasionally, a so-called condensing mode in which a medium for removing polymerization heat is present together can be employed.

The polymerization temperature in the liquid phase or gas phase polymerization is generally 0 to 300° C., practically 20 to 200° C. The catalyst concentration and the ethylene pressure in the reactor can be optional so long as such are sufficient to proceed polymerization. Further, hydrogen or the like can be present together for controlling molecular weight.

Further, if required and necessary, copolymerization can be conducted by introducing at least one kind of α-olefin such as propylene, 1-butene, 1-hexene, 4-methyl-1-pentene or 1-octene, together with ethylene.

In the present invention, in any of the above-described polymerization methods, not only a single stage polymerization using one reactor to produce an ethylene polymer but a multi-stage polymerization by connecting at least two reactors for broadening molecular weight distribution is preferably conducted. The two-stage polymerization is more preferable, in which two reactors are connected and a reaction mixture obtained by polymerization in the first reactor is continuously supplied to the second reactor. Supply of from the first reactor to the second reactor is conducted through a connecting pipe by a differential pressure due to a continuous discharge of the polymerization reaction mixture from the second reactor.

By controlling hydrogen concentration, either of a production process of producing a high molecular weight component in the first reactor and a low molecular weight component in the second reactor, or producing a low molecular weight component in the first reactor and a high molecular weight component in the second reactor may be employed. However, the production process of producing a high molecular weight component in the first reactor and a low molecular weight component in the second reactor is preferable in the point of the productivity that an Intermediate flash tank for hydrogen is not needed in moving from the first reactor to the second reactor.

In the first reactor, polymerization of ethylene alone or, if necessary copolymerization of ethylene and α-olefin is conducted while controlling a molecular weight by a mass ratio or a partial pressure ratio of hydrogen concentration to ethylene concentration, and also controlling a density by a mass ratio or a partial pressure ratio of α-olefin concentration to ethylene concentration.

In the second reactor, polymerization reaction is conducted while controlling a molecular weight by a mass ratio or a partial pressure ratio of hydrogen concentration in the reaction mixture flown from the first reactor and/or hydrogen concentration supplied in the second reactor if necessary to ethylene concentration, and also controlling a density by a mass ratio or a partial pressure ratio of α-olefin concentration in the reaction mixture flown from the first reactor and/or α-olefin concentration supplied in the second reactor if necessary to ethylene concentration. Not only polymerization reaction is subsequently conducted in the second reactor by a catalyst flown from the first reactor, but a fresh catalyst may be supplied in the second reactor.

In producing an ethylene polymer by a two-stage polymerization, the ratio of the high molecular weight component and the low molecular weight component is such that the high molecular weight component is 10 to 90 parts by mass and the low molecular weight component is 90 to 10 parts by mass, preferably the high molecular weight component is 20 to 80 parts by mass and the low molecular weight component is 80 to 20 parts by mass, and more preferably the high molecular weight component is 30 to 70 parts by mass and the low molecular weight component is 70 to 30 parts by mass.

HLMFR of the high molecular weight component is 0.01 to 100 g/10 min, preferably 0.01 to 50 g/10 min, and MFR of the low molecular weight component is 10 to 1,000 g/10 min, and preferably 10 to 500 g/10 min. HLMFR of the ethylene polymer obtained by two-stage polymerization is 0.1 to 1,000 g/10 min, preferably 0.5 to 500 g/10 min. Density of the ethylene polymer obtained by two-stage polymerization is 0.900 to 0.980 g/cm$^3$, preferably 0.920 to 0.970 g/cm$^3$. The ethylene polymer obtained is then preferably kneaded. In general, kneading is conducted using a single-screw or twin-screw extruder or a continuous kneader.

By practicing the process of the present invention, an ethylene polymer having low molecular weight, having narrow molecular weight distribution and being suitable for used in injection molding or an ethylene polymer having a broad molecular weight distribution, having excellent balance between rigidity and ESCR and being suitable for use in blow molding or film molding can efficiently be obtained.

BEST MODE FOR CARRYING OUT THE INVENTION

The present invention is described in more detail by reference to the following examples and comparative examples, but it should be understood that the invention is not construed as being limited thereto.

Measurement methods of physical properties employed in the examples and comparative examples are as follows.

a) Polymer Pre-treatment for Measurement of Physical Properties 0.2% of IRGANOX B225, a product of Ciba Geigy AG was added to a polymer as an additive, and the mixture was kneaded at 190° C. for 7 minutes under nitrogen atmosphere using plastgraph (Labo Plastmill ME 25; roller shape is R608 type, manufactured by Toyo Seiki Seisaku-sho, Ltd.).

b) Melt Flow Rate

Measurement value at a temperature of 190° C. under a load of 2.16 kg according to Condition 4 in Table 1 of JISK-7210 (1996) was shown as MFR, and measurement value at a temperature of 190° C. under a load of 21.6 kg according to Condition 7 in Table 1 was shown as HLMFR.

c) Density

Measured according to JIS K-7112 (1996)

d) Molecular Weight Distribution (Mw/Mn) Gel permeation chromatograph (GPC) shown below was conducted on an ethylene polymer produced to obtain a number average molecular weight (Mn) and a weight average molecular weight (Mw), and a molecular weight distribution (Mw/Mn) was calculated from those values.

Measurement conditions of gel permeation chromatograph:
Device: WATERS 150C Model
Column: Shodex-HT806M
Solvent: 1,2,4-Trichlorobenzene
Temperature: 135° C.

Universal evaluation was made using a monodisperse polystyrene fraction.

Regarding a molecular weight distribution (molecular weight distribution is broad as Mw/Mn is large) shown by the ratio (Mw/Mn) of Mw to Mn, data of n-alkane and fractionated straight chain polyethylene of Mw/Mn≦1.2 are applied to equations of molecular weight and detector sensitivity described in Sadao Mori, "Size Exclusion Chromatography (High speed liquid chromatography of polymers)", page 96, Kyoritsu Shuppan to obtain sensitivity of molecular weight M shown by the following equation, and compensation of measured value of sample was made.

Sensitivity of molecular weight M=a+b/M wherein a and b are a constant; a=1.032 and b=189.2.

e) Tensile Impact

Tensile impact ($kJ/m^2$) measured at 23° C. according to ASTM D-1822 was used as a value of impact resistance.

f) Melt Tension

Measured under conditions of resin temperature 210° C., orifice diameter 2.1 mm, orifice length 8 mm, extrusion speed 15 mm/min and wind-up speed 6.5 m/min using a melt tension tester, manufactured by Toyo Seiki Seisaku-sho, Ltd.

g) Rigidity

Modulus in bending measured according to JIS K-7203 (1996) was used as a value of rigidity.

h) ESCR (Environmental Stress Crack Resistance)

F50 value by BTL method measured according to JIS K-6760 (1996) was used as a value of ESCR.

EXAMPLE 1

(1) Synthesis of bis(Trimehylsilyl)methyl Lithium (Li[CH(SiMe$_3$)$_2$])

Bis(trimethylsilyl)methyl lithium was synthesized according to the method described in J. Chem. Soc. Dalton, 2268 (1976) as follows. 1.10 g (158 mmol) of metallic lithium was put into a 200 ml flask the inner atmosphere of which had previously been replaced by nitrogen gas, and 40 ml of diethyl ether was then added to the flask to prepare a slurry. After cooling the flask to 0 to 3° C. with an ice bath, a solution obtained by diluting 5.01 g (5.6 ml, 25.7 mmol) of bis(trimethylsilyl)chloromethane (a product of Aldrich Co.) with 10 ml of diethyl ether was added dropwise to the flask. After completion of the dropwise addition, temperature of the reaction solution was returned to room temperature, and the solution was further stirred for 12 hours under reflux. Precipitate of lithium chloride by-produced and excess metallic lithium were removed by filtration with a glass filter. Alkyl lithium concentration in the solution obtained was 0.533 mol/liter.

(2) Synthesis of tris[bis(Trimethylsilyl)methyl Chromium (III) (Cr[CH(SiMe$_3$)$_2$]$_3$)

Tris[bis(trimethylsilyl)methyl chromium(III) was synthesized according to the method described in J. Chem. Soc. Dalton, 734 (1977) as follows. 0.48 g (3.03 mmol) of anhydrous chromium trichloride (a product of Nakalai Tesque Inc.) was put into a 100 ml flask the inner atmosphere of which had previously been replaced by nitrogen gas, and 50 ml of diethyl ether was then added to the flask to prepare a slurry. After cooling the flask with a dry ice-alcohol bath, 17. 1 ml (9.09 mmol) of a diethyl ether solution of bis(trimethylsilyl)methyl lithium synthesized in (1) above was added dropwise to the flask over 1 hour. After completion of the dropwise addition, temperature of the reaction solution was returned to room temperature and the solution was stirred for 2 hours. Precipitate of lithium chloride was formed. Solvent was completely removed under reduced pressure to obtain a dark green bulk. 80 ml of hexane was added to the bulk to dissolve the bulk therein, and after centrifugal separation, only a supernatant liquid was collected. Chromium concentration in the solution was measured and was found to be 0.0538 mol/liter, 2.80 g/liter.

(3) Preparation of Catalyst 3.0 g of CARiACT P-3 grade silica (average particle size 35 am, specific surface area 720 $m^2/g$, pore volume 1.2 $cm^3/g$), a product of Fuji Silysia Chemical, Ltd., calcined at 200° C. for 24 hours, was put into a 100 ml flask the inner atmosphere of which had previously been replaced by nitrogen gas, and 30 ml of hexane was added to the flask to prepare a slurry. 2.15 ml of a hexane solution of the trivalent alkyl chromium compound (corresponding to chromium atom supporting amount=0.20%) obtained in (2) above was added to the slurry, and the mixture was stirred at 45° C. for 2 hours. 0.58 ml of 1.0 mol/liter hexane solution of triethyl aluminum (a product of Tosoh.Akzo Co.) was further added (aluminum atom/chromium atom molar ratio=5), and the mixture was stirred at 45° C. for 2 hours. Solvent was removed under reduced pressure to obtain a dry free flowing catalyst.

(4) Polymerization 0.6 liter of isobutane and 0.12 g of the catalyst obtained in (3) above were charged in a 1.5 liters autoclave the inner atmosphere of which had sufficiently replaced by nitrogen gas, and the inner temperature was elevated to 100° C. Ethylene was introduced into the autoclave under pressure, and polymerization was conducted for 1 hour while maintaining ethylene partial pressure to be 1.4 MPa. Gas in the autoclave was discharged into atmosphere to complete polymerization. 120 g of polyethylene was obtained. Polymerization activity per 1 g of catalyst, 1 hour of polymerization and 1 MPa of ethylene was 710 g/g·hr·MPa. Further, polymerization activity per 1 mmol of chromium atom, 1 hour of polymerization and 1 MPa of ethylene was 18,600 g/mmol-Cr·hr·MPa. The results of measurement of physical properties are shown in Table 1 below.

EXAMPLE 2

In Example 1 (3), after completion of the supporting reaction of this [bis(trimethylsilyl)methyl]chromium(III), solvent was removed under reduced pressure to obtain a free flowing solid component. 0.12 g of this solid component was put into an autoclave, and polymerization was conducted by adding triethyl aluminum so as to be aluminum atom/chromium atom molar ratio=5 at the time of polymerization by pressuring ethylene. As a result, 118 g of polyethylene was obtained. Polymerization activity per 1 g of catalyst, 1 hour of polymerization and 1 MPa of ethylene was 700 g/g-hr·MPa. Further, polymerization activity per 1 mmol of chromium atom, 1 hour of polymerization and 1 MPa of ethylene was 18,300 g/mmol-Cr·hr·MPa. The results of measurement of physical properties are shown in Table 1 below.

EXAMPLE 3

A catalyst was prepared in the same manner as in Example 1 except that CARiACT P-3 grade silica calcined at 650° C.

for 24 hours was used in place of CARiACT P-3 grade silica (a product of Fuji Silysia Chemical, Ltd.) calcined at 200° C. for 24 hours in Example 1 (3), and polymerization was conducted. As a result, 104 g of polyethylene was obtained. Polymerization activity per 1 g of catalyst, 1 hour of polymerization and 1 MPa of ethylene was 620 g/g·hr·MPa. Further, polymerization activity per 1 mmol of chromium atom, 1 hour of polymerization and 1 MPa of ethylene was 16,100 g/mmol-Cr·hr·MPa. The results of measurement of physical properties are shown in Table 1 below.

EXAMPLE 4

A catalyst was prepared in the same manner as in Example 1 except that tris[bis(trimethylsilyl)methyl]chromium was supported on CARiACT P-3 grade silica (a product of Fuji Silysia Chemical, Ltd.) calcined at 650° C. for 24 hours in place of CARiACT P-3 grade silica calcined at 200° C. for 24 hours and solvent was removed under reduced pressure without addition of organoaluminum in Example 1 (3), and polymerization was then conducted. As a result, 102 g of polyethylene was obtained. Polymerization activity per 1 g of catalyst, 1 hour of polymerization and 1 MPa of ethylene was 610 g/g·hr·MPa. Further, polymerization activity per 1 mmol of chromium atom, 1 hour of polymerization and 1 MPa of ethylene was 15,900 g/mmol-Cr·hr·MPa. The results of measurement of physical properties are shown in Table 1 below.

EXAMPLE 5

A catalyst was prepared in the same manner as in Example 1 except that the addition amount of the solution of tris[bis (trimethylsilyl)methyl]chromium(III) was changed to 5.37 ml (chromium atom supporting amount=0.50%) and the addition amount of triethyl aluminum was changed to 1.44 ml (aluminum/chromium molar ratio=5) in Example 1 (3), and polymerization was then conducted. As a result, 183 g of polyethylene was obtained. Polymerization activity per 1 g of catalyst, 1 hour of polymerization and 1 MPa of ethylene was 1,090 g/g-hr·MPa. Further, polymerization activity per 1 mmol of chromium atom, 1 hour of polymerization and 1 MPa of ethylene was 11,300 g/mmol-Cr·hr·MPa. The results of measurement of physical properties are shown in Table 1 below.

EXAMPLE 6

A catalyst was prepared in the same manner as in Example 1 except that CARiACT P-3 grade silica(a product of Fuji Silysia Chemical, Ltd.) calcined at 650° C. for 24 hours was used in place of CARiACT P-3 grade silica calcined at 200° C. for 24 hours, the addition amount of the solution of tris[bis(trimethylsilyl)methyl]chromium(III) was changed to 5.37 ml(chromium atom supporting amount=0.50%) and solvent was removed under reduced pressure without addition of organoaluminum after supporting the chromium compound in Example 1 (3), and polymerization was then conducted. As a result, 195 g of polyethylene was obtained. Polymerization activity per 1 g of catalyst, 1 hour of polymerization and 1 MPa of ethylene was 1,160 g/g·hr·MPa. Further, polymerization activity per 1 mmol of chromium atom, 1 hour of polymerization and 1 MPa of ethylene was 12,100 g/mmol-Cr·hr·MPa. The results of measurement of physical properties are shown in Table 1 below.

EXAMPLE 7

Polymerization was conducted in the same manner as in Example 1 except f or introducing 0.5 MPa of hydrogen. As a result, 102 g of polyethylene was obtained. Polymerization activity per 1 g of catalyst, 1 hour of polymerization and 1 MPa of ethylene was 610 g/g·hr·MPa. Further, polymerization activity per 1 mmol of chromium atom, 1 hour of polymerization and 1 MPa of ethylene was 15,800 g/mmol-Cr·hr·MPa. The results of measurement of physical properties are shown in Table 1 below.

EXAMPLE 8

Polymerization was conducted in the same manner as in Example 1 except for using the catalyst used in Example 4 and introducing 0.5 MPa of hydrogen. As a result, 76 g of polyethylene was obtained. Polymerization activity per 1 g of catalyst, 1 hour of polymerization and 1 MPa of ethylene was 450 g/g·hr·MPa. Further, polymerization activity per 1 mmol of chromium atom, 1 hour of polymerization and 1 MPa of ethylene was 11,700 g/mmol-Cr·hr·MPa. The results of measurement of physical properties are shown in Table 1 below.

EXAMPLE 9

Gas Phase Polymerization:

Gas phase polymerization was conducted as follows using a fluidized bed type vertical vibration type reactor (volume 150 cm$^3$, diameter 50 mm, vibration rate 420 times/min (7 Hz, vibration distance 6 cm) which is the same as described in Eur. Polym. J., Vol. 21, 245 (1985).

An ampoule having 100 mg of the catalyst obtained in Example 1 (3) sealed therein under nitrogen atmosphere was placed in the reactor the inner atmosphere of which had previously been replaced by nitrogen gas. The reactor was heated to 97° C. and 0.5 MPa of ethylene was introduced therein under pressure. Vibration was initiated to break the ampoule, thereby initiating polymerization.

According to the need, ethylene was supplied to the reactor via a flexible joint so as to maintain the pressure of ethylene in the reactor. After conducting polymerization reaction at 100° C. for 1 hour, supply of ethylene was stopped. The reactor was cooled to room temperature, gas was discharged and the contents were taken out. As a result, 33 g of polyethylene was obtained. Polymerization activity per 1 g of catalyst, 1 hour of polymerization and 1 MPa of ethylene was 660 g/g·hr·Mpa. Further, polymerization activity per 1 mmol of chromium atom, 1 hour of polymerization and 1 MPa of ethylene was 17,200 g/mmol-Cr·hr·MPa. The results of measurement of physical properties are shown in Table 1 below.

EXAMPLE 10

Gas phase polymerization was conducted in the same manner as in Example 9 except for using the catalyst as used in Example 4. As a result, 28 g of polyethylene was obtained. Polymerization activity per 1 g of catalyst, 1 hour of polymerization and 1 MPa of ethylene was 560 g/g·hr·MPa. Further, polymerization activity per 1 mmol of chromium atom, 1 hour of polymerization and 1 MPa of ethylene was 14,600 g/mmol-Cr·hr·MPa. The results of measurement of physical properties are shown in Table 1 below.

EXAMPLE 11

Polymerization was conducted in the same manner as in Example 1 except for introducing 10 ml of 1-hexene by pressurizing with ethylene. As a result, 106 g of polyethylene was obtained. Polymerization activity per 1 g of catalyst and 1 hour of polymerization was 630 g/g·hr·Mpa. Further, polymerization activity per 1 mmol of chromium atom, 1 hour of polymerization and 1 MPa of ethylene was 16,400 g/mmol-Cr·hr·MPa. The results of measurement of physical properties are shown in Table 1 below.

Further, the polyethylene had a number average molecular weight (Mn) of $2.3 \times 10^4$, a weight average molecular weight (Mw) of $39.5 \times 10^4$, a molecular weight distribution (Mw/Mn) of 17.2 and a tensile impact of 360 ($kJ/m^2$).

EXAMPLE 12

Polymerization was conducted in the same manner as in Example 1 except for using the catalyst as used in Example 4 and introducing 10 ml of 1-hexene by pressurizing with ethylene. As a result, 81 g of polyethylene was obtained. Polymerization activity per 1 g of catalyst, 1 hour of polymerization and 1 MPa of ethylene was 480 g/g·hr·MPa. Further, polymerization activity per 1 mmol of chromium atom, 1 hour of polymerization and 1 MPa of ethylene was 12,500 g/mmol-Cr·hr·MPa. The results of measurement of physical properties are shown in Table 1 below.

Further, the polyethylene had a number average molecular weight (Mn) of $2.2 \times 10^4$, a weight average molecular weight (Mw) of $35.9 \times 10^4$, a molecular weight distribution (Mw/Mn) of 16.3 and a tensile impact of 330 ($kJ/m^2$).

EXAMPLE 13

2 g of the catalyst as used in Example 1 was sealed in 10 ml glass ampoule under nitrogen atmosphere, and the glass ampoule was stored in a constant temperature bath at 50° C. for 2 weeks. The ampoule was taken out of the constant temperature bath and polymerization was conducted in the same manner as in Example 1. As a result, 118 g of polyethylene was obtained. Polymerization activity per 1 g of catalyst, 1 hour of polymerization and 1 MPa of ethylene was 700 g/g·hr·MPa. Further, polymerization activity per 1 mmol of chromium atom, 1 hour of polymerization and 1 MPa of ethylene was 18,300 g/mmol-Cr·hr·MPa. The results of measurement of physical properties are shown in Table 1 below. The performance was the same as in Example 1 and deterioration with the passage of time did not cause.

COMPARATIVE EXAMPLE 1

Tris(4-camphyl)chromium(III) (i.e. tris(2,2,3-trimethyl-bicyclo-[2,2,1]-heptyl)chromium(III)) was synthesized by the reaction of 4-camphyl lithium and tetrahydrofuran complex of chromium trichloride according to the method disclosed in JP-A-47–17753. A catalyst was prepared in the same manner as in Example 1 except for adding a hexane solution of this compound in place of tris[bis(trimethylsilyl)methyl]chromium(III), to silica such that the chromium atom supporting amount was 1.0%, and polymerization was conducted. As a result, 105 g of polyethylene was obtained. Polymerization activity per 1 g of catalyst, 1 hour of polymerization and 1 MPa of ethylene was 630 g/g·hr·MPa. Further, polymerization activity per 1 mmol of chromium atom, 1 hour of polymerization and 1 MPa of ethylene was 3,300 g/mmol-Cr·hr·MPa. The results of measurement of physical properties are shown in Table 1 below.

COMPARATIVE EXAMPLE 2

2 g of the catalyst as used in Comparative Example 1 was sealed in 10 ml glass ampoule under nitrogen atmosphere, and the glass ampoule was stored in a constant temperature bath at 50° C. for 2 weeks. The ampoule was taken out of the constant temperature bath and polymerization was conducted in the same manner as in Example 1. As a result, 5.7 g of polyethylene was obtained. Polymerization activity per 1 g of catalyst and 1 hour of polymerization was 34 g/g·hr·MPa. Further, polymerization activity per 1 mmol of chromium atom, 1 hour of polymerization and 1 MPa of ethylene was 880 g/mmol-Cr·hr·MPa. Compared to Comparative Example 1, activity thereof was extremely lowered due to deterioration with the passage of time caused by heat. Measurement of physical properties could not be carried out.

COMPARATIVE EXAMPLE 3

($\eta^5$-Pentamethylcyclopentadienyl)(dimethyl)(tetrahydrofuran)chromium(III) Cp*CrMe$_2$ (THF) was synthesized according to the method described in U.S. Pat. No. 5,418,200. A catalyst was prepared in the same manner as in Example 1 except for adding a hexane solution of this compound in place of tris[bis(trimethylsilyl)methyl]chromium(III), to silica such that the chromium atom supporting amount was 0.5%, and polymerization was conducted. As a result, 12 g of polyethylene was obtained. Polymerization activity per 1 g of catalyst, 1 hour of polymerization and 1 MPa of ethylene was 71 g/g·hr·MPa. Further, polymerization activity per 1 mmol of chromium atom, 1 hour of polymerization and 1 MPa of ethylene was 740 g/mmol-Cr·hr·MPa. The results of measurement of physical properties are shown in Table 1 below.

COMPARATIVE EXAMPLE 4

Polymerization was conducted in the same manner as in Example 1 except for using the catalyst as used in Comparative Example 3 and introducing 10 ml of 1-hexene by pressurizing with ethylene. As a result, 13 g of polyethylene was obtained. Polymerization activity per 1 g of catalyst, 1 hour of polymerization and 1 MPa of ethylene was 77 g/g·hr·MPa. Further, polymerization activity per 1 mmol of chromium atom, 1 hour of polymerization and 1 MPa of ethylene was 800 g/mmol-Cr·hr·MPa. The results of measurement of physical properties are shown in Table 1 below. It is apparent that as compared with Comparative Example 3, density does not almost change and copolymerizability is considerably low.

COMPRATIVE EXAMPLE 5

(1) Preparation of Chromocene Catalyst

A chromocene catalyst was prepared in the same method as described in Jpn. J. Appl. Phys., Vol. 32, Suppl. 32–2, 511(1993) as follows.

3.0 g of silica (a product of W.R. Grace Corporation, grade 952, average particle size 80 μm, specific surface area 300 $m^2/g$, pore volume 1.6 $cm^3/g$) calcined at 600° C. for 24 hours was put into a 100 ml flask the inner atmosphere of which had already been replaced by nitrogen gas, and 30 ml of hexane was then added to the flask to prepare a slurry. A heptane solution of bis(cyclopentadienyl)chromium(II) (called chromocene) (a product of STREM) was added to the slurry such that the chromium atom supporting amount was 1.0%. The mixture was stirred at 30° C. for 1 hour. Solvent was removed under reduced pressure to obtain a dry free flowing catalyst.

(2) Polymerization

Polymerization was conducted in the same manner as in Example 1 except for using the above catalyst and introducing hydrogen of 0.2 MPa. As a result, 42 g of polyethylene was obtained. Polymerization activity per 1 g of catalyst, 1 hour of polymerization and 1 MPa of ethylene was 250 g/g·hr·MPa. Further, polymerization activity per 1 mmol of chromium atom, 1 hour of polymerization and 1 MPa of ethylene was 1,300 g/mmol-Cr·hr·MPa. The results of measurement of physical properties are shown in Table 1 below.

COMPRATIVE EXAMPLE 6

Polymerization was conducted in the same manner as in Example 1 except for using the catalyst as used in Comparative Example 5, introducing hydrogen of 0. 2 MPa and conducting copolymerization by introducing 10 ml of 1-hexene by pressurizing with ethylene. As a result, 30 g of polyethylene was obtained. Polymerization activity per 1 g of catalyst, 1 hour of polymerization and 1 MPa of ethylene was 180 g/g·hr·MPa. Further, polymerization activity per 1 mmol of chromium atom, 1 hour of polymerization and 1 MPa of ethylene was 940 g/mmol-Cr·hr·MPa. The results of measurement of physical properties are shown in Table 1 below. It is apparent that as compared with Comparative Example 5, density does not almost change and copolymerizability is considerably low.

COMPRATIVE EXAMPLE 7

Polymerization was conducted in the same manner as in Example 1 except for using the catalyst obtained by calcining Phillips catalyst (a product of Grace Corporation, Magnapore 963, chromium atom supporting amount=1.0%, titanium atom supporting amount=2.5%) in air at 800° C. for 18 hours to activate the same, changing the polymerization temperature to 85° C. and introducing and conducting copolymerization by introducing 10 ml of 1-hexene by pressurizing with ethylene. As a result, 156 g of polyethylene was obtained. Polymerization activity per 1 g of catalyst, 1 hour of polymerization and 1 MPa of ethyle was 930 g/g·hr·MPa. Further, polymerization activity per 1 mmol of chromium atom, 1 hour of polymerization and 1 MPa of ethylene was 4,800 g/mmol-Cr·hr·MPa. The results of measurement of physical properties are shown in Table 1 below.

Further, the polyethylene had a number average molecular weight (Mn) of $1.6 \times 10^4$, a weight average molecular weight (Mw) of $35.2 \times 10^4$, a molecular weight distribution (Mw/Mn) of 22.0 and a tensile impact of 280 $(kJ/m^2)$. Thus, impact strength was poor as compared with that of Example 11 and Example 12.

COMPRATIVE EXAMPLE 8

Polymerization was conducted in the same manner as in Example 1 except for using the catalyst as used in Comparative Example 7, changing the polymerization temperature to 85° C. and introducing hydrogen of 0.5 MPa and conducting copolymerization by introducing 10 ml of 1-hexene by pressurizing with ethylene. As a result, 143 g of polyethylene was obtained. Polymerization activity per 1 g of catalyst, 1 hour of polymerization and 1 MPa of ethylene was 850 g/g·hr·Mpa. Further, polymerization activity per 1 mmol of chromium atom, 1 hour of polymerization and 1 MPa of ethylene was 4,400 g/mmol-Cr·hr·MPa. The results of measurement of physical properties are shown in Table 1 below. Further, the polyethylene had a number average molecular weight (Mn) of $1.5 \times 10^4$, a weight average molecular weight (Mw) of $32.9 \times 10^4$, a molecular weight distribution (Mw/Mn) of 21.9 and a tensile impact of 270 $(kJ/m^2)$.

It is apparent that HLMFR does not almost change as compared with Comparative Example 7, and it is difficult to control a molecular weight by hydrogen.

EXAMPLE 14

2 g of the catalyst as used in Example 1 was sealed in a 10 ml glass ampoule under nitrogen atmosphere. This glass ampoule was exposed to 275W solar lamp for 24 hours at a distance of 30 cm to irradiate with a visible light. The glass ampoule was covered with an aluminum foil to shield light and allowed to stand at 25° C. for 24 hours. Polymerization was then conducted in the same manner as in Example 1. As a result, 121 g of polyethylene was obtained. Polymerization activity per 1 g of catalyst, 1 hour of polymerization and 1 MPa of ethylene was 720 g/g·hr·Mpa. Further, polymerization activity per 1 mmol of chromium atom, 1 hour of polymerization and 1 MPa of ethylene was 18,700 g/mmol-Cr·hr·MPa. The results of measurement of physical properties are shown in Table 1 below. The performance is the same as in Example 1, and deterioration by light did not cause.

COMPRATIVE EXAMPLE 9

Radiation with visible light was conducted in the same manner as in Example 14 using the catalyst as used in Comparative Example 1 in place of the catalyst as used in Example 1. The glass ampoule was shielded from light and allowed to stand. Polymerization was then conducted in the same manner as in Example 1. As a result, 32 g of polyethylene was obtained. Polymerization activity per 1 g of catalyst, 1 hour of polymerization and 1 MPa of ethylene was 270 g/g·hr·MPa. Further, polymerization activity per 1 mmol of chromium atom, 1 hour of polymerization and 1 MPa of ethylene was 1,400 g/mmol-Cr·hr·MPa. The results of measurement of physical properties are shown in Table 1 below. It is apparent that deterioration by light causes as compared with Comparative Example 1, and activity greatly decreases.

TABLE 1

| Example Number | Activity per catalyst (g/g · hr · MPa) | Activity per chromium atom (g/mmol-Cr · hr · MPa) | HLMFR (g/10 min) | Density (g/cm³) |
| --- | --- | --- | --- | --- |
| 1 | 710 | 18600 | 1.3 | 0.9562 |
| 2 | 700 | 18300 | 1.3 | 0.9562 |
| 3 | 620 | 16100 | 3.5 | 0.9562 |
| 4 | 610 | 15900 | 4.0 | 0.9567 |
| 5 | 1090 | 11300 | 1.4 | 0.9565 |
| 6 | 1160 | 12100 | 3.6 | 0.9573 |
| 7 | 610 | 15800 | 4.2 | 0.9580 |
| 8 | 450 | 11700 | 7.3 | 0.9586 |
| 9 | 660 | 17200 | 1.4 | 0.9566 |
| 10 | 560 | 14600 | 3.5 | 0.9568 |
| 11 | 630 | 16400 | 4.3 | 0.9448 |
| 12 | 480 | 12500 | 7.2 | 0.9444 |

TABLE 1-continued

| Example Number | Activity per catalyst (g/g · hr · MPa) | Activity per chromium atom (g/mmol-Cr · hr · MPa) | HLMFR (g/10 min) | Density (g/cm³) |
|---|---|---|---|---|
| 13 | 700 | 18300 | 1.3 | 0.9560 |
| 14 | 720 | 18700 | 1.5 | 0.9561 |
| Comparative Example 1 | 630 | 3300 | 1.0 | 0.9564 |
| Comparative Example 2 | 34 | 180 | — | — |
| Comparative Example 3 | 71 | 740 | 5.7 | 0.9582 |
| Comparative Example 4 | 77 | 800 | 5.9 | 0.9580 |
| Comparative Example 5 | 250 | 1300 | 250 | 0.9625 |
| Comparative Example 6 | 180 | 940 | 270 | 0.9626 |
| Comparative Example 7 | 930 | 4800 | 7.0 | 0.9446 |
| Comparative Example 8 | 850 | 4400 | 7.5 | 0.9447 |
| Comparative Example 9 | 270 | 1400 | 1.5 | 0.9566 |

EXAMPLE 15

(1) Synthesis of bis(Trimethylsilyl)methyl Lithium (Li[(SiMe$_3$)$_2$])

Bis(trimethylsilyl)methyl lithium was synthesized according to the method described in J. Chem. Soc. Dalton, 2268 (1976) as in Example 1 (1). Alkyl lithium concentration in the solution on obtained was 0.533 mol/liter.

(2) Synthesis of tris[bis(Trimethylsilyl)methyl Chromium (III) (Cr[CH(SiMe$_3$)$_2$]$_3$)

Tris[bis(trimethylsilyl)methyl chromium(III) was synthesized according to the method described in J. Chem. Soc. Dalton, 734 (1977) as in Example 1 (2). Chromium concentration in the solution after centrifugal separation was 0.0538 mol/liter, 2.80 g/liter.

(3) Synthesis of Tetrakis(2,2-dimethylpropyl)chromium(IV) (Cr(CH$_2$CMe$_3$)$_4$)

CrCl$_3$(THF)$_3$ (a product of Aldrich Co.) and 2,2-dimethylpropyl magnesium chloride (synthesized from 1-chloro-2,2-dimethylpropane, a product of Aldrich Co. and magnesium, a product of Wako Pure Chemicals Co.) were reacted according to a method described in J. Chem. Soc., Dalton Trans., 770 (1973) to prepare tetrakis(2,2-dimethylpropyl)chromium(III). This compound was dissolved in distillation-purified hexane to obtain a solution of 0.10 mol/liter, 5.20 g/liter.

(4) Preparation of Catalyst 3.0 g of silica (a product of W.R. Grace Corporation, grade 952, average particle size 80 Am, specific surface area 300 m²/g, pore volume 1.6 cm³/g) calcined at 600° C. for 24 hours was put into a 100 ml flask the inner atmosphere of which had already been replaced by nitrogen gas, and 30 ml of hexane was then added to the flask to prepare a slurry. 2.1 ml of a hexane solution of the trivalent alkyl chromium compound obtained in (2) above (chromium atom supporting amount=0.20%) was added to the slurry and the mixture was stirred at 45° C. for 1 hour. 1.2 ml of a hexane solution of the tetravalent alkyl chromium compound obtained (3) above (chromium atom supporting amount=0.20%) was further added and the mixture was stirred at 45° C. for 1 hour. Solvent was removed under reduced pressure to obtain a dry free flowing catalyst.

(5) Polymerization 0.12 g of the catalyst obtained in (4) above and 0.6 liter of isobutane were charged into a 1.5 liters autoclave the inner atmosphere of which had sufficiently replaced with nitrogen gas, and the inner temperature was elevated to 105° C. After introducing hydrogen of 1.0 MPa, 5 ml of 1-hexene was introduced by pressurizing with ethylene. Polymerization was conducted for 1 hour while maintaining ethylene partial pressure at 1.4 MPa. Inner gas was discharged to complete the polymerization. As a result, 232 g of polyethylene was obtained. Polymerization activity per 1 g of catalyst, 1 hour of polymerization and 1 MPa of ethylene was 1,380 g/g·hr·Mpa. The results of measurement of physical properties are shown in Table 2 below.

EXAMPLE 16

(1) Synthesis of tris(2,2,3-Trimethyl-bicyclo-[2,2,1]-heptyl)chromium(III) (Called tris(4-Camphyl)chromium(III))

Tris(2,2,3-trimethyl-1-bicyclo-[2,2,1]-heptyl)chromium (III) (called tris(4-camphyl)chromium(III)) was synthesized from 1-(2,2,3-trimethyl-1-bicyclo-[2,2,1]-heptyl)lithium and CrCl$_3$·3THF according to the method described in JP-A-47-17753. This compound obtained was dissolved in hexane. When chromium concentration of the hexane solution obtained was measured, it was 0.0510 mol/liter, 2.65 g/liter.

(2) Preparation of Catalyst and Polymerization

A catalyst was prepared in the same manner as in Example 15 except for adding 2.3 ml of hexane solution of the trivalent alkyl chromium compound obtained in (1) above (chromium atom supporting amount=0.20%) in place of tris[bis(trimethylsilyl)methyl]chromium(III), and polymerization was conducted. As a result, 239 g of polyethylene was obtained. The polymerization activity per 1 g of catalyst, 1 hour of polymerization and 1 MPa of ethylene was 1,420 g/g·hr·MPa. The results of measurement of physical properties are shown in Table 2 below.

EXAMPLE 17

(1) Synthesis of Tetrakis(2-methyl-2-phenylpropyl)chromium(IV) (Cr(CH$_2$CMe$_2$Ph)$_4$)

CrCl$_3$(THF)$_3$ (a product of Aldrich Co.) and 2-methyl-2-phenylpropyl magnesium chloride (synthesized from 1-chloro-2-methyl-2-phenylpropane, a product of Aldrich Co. and magnesium, a product of Wako Pure Chemicals Co.) were reacted according to the method described in J. Chem.

Soc., Dalton Trans., 770 (1973) to synthesize tetrakis(2-methyl-2-phenylpropyl)chromium(IV). This compound obtained was dissolved in distillation-purified hexane to obtain a solution of 0.10 mol/liter, 5.20 g/liter.

(2) Preparation of Catalyst and Polymerization

A catalyst was prepared in the same manner as in Example 15 except for adding the tetravalent alkyl chromium compound synthesized in (1) above such that the chromium atom supporting amount was 0.20%, in place of tetrakis(2,2-dimethylpropyl)chromium(IV), and polymerization was conducted. As a result, 262 g of polyethylene was obtained. The polymerization activity per 1 g of catalyst, 1 hour of polymerization and 1 MPa of ethylene was 1,560 g/g·hr·Mpa. The results of measurement of physical properties are shown in Table 2 below.

EXAMPLE 18

A catalyst was prepared in the same manner as in Example 15 except that in Example 1 (4), tris(2,2,3-trimethyl-1-bicyclo-[2,2,1]-heptyl)chromium(III) (called tris(4-camphyl)chromium (III)) synthesized in Example 16 (1) was added as the trivalent alkyl chromium compound in place of tris[bis(trimethylsilyl)methyl]chromium(III) and tetrakis(2-methyl-2-phenylpropyl)chromium(IV) synthesized in Example 17 (1) was added as the tetravalent alkyl chromium compound in place of tetrakis(2,2-dimethylpropyl)chromium(IV), in an amount such that the chromium atom supporting amount was 0.20%, respectively, and polymerization was conducted. As a result, 242 g of polyethylene was obtained. The polymerization activity per 1 g of catalyst, 1 hour of polymerization and 1 MPa of ethylene was 1,440 g/g·hr·Mpa. The results of measurement of physical properties are shown in Table 2 below.

EXAMPLE 19

A catalyst was prepared in the same manner as in Example 15 except that in Example 15 (4), the order of addition of the trivalent alkyl chromium compound and the tetravalent alkyl chromium compound was reversed, and polymerization was conducted. As a result, 152 g of polyethylene was obtained. The polymerization activity per 1 g of catalyst, 1 hour of polymerization and 1 MPa of ethylene was 1,270 g/g·hr·Mpa. The results of measurement of physical properties are shown in Table 2 below.

EXAMPLE 20

Gas Phase Polymerization:

Gas phase polymerization was conducted as follows using a vertical vibration type reactor (volume: 150 cm$^3$, diameter: 50 mm, vibration rate: 420 times/min (7 Hz), vibration distance: 6 cm) which is the same as a fluidized bed type reactor described in Eur. Polym. J., Vol. 21, 245 (1985).

An ampoule in which 100 mg of the catalyst obtained in Example 15 (4) had been sealed under nitrogen atmosphere was placed in the reactor the inner atmosphere of which had previously been replaced by nitrogen gas, and the reactor was heated to 102° C. After introducing hydrogen of 0.3 MPa, 3 ml of 1-hexene was introduced into the reactor by pressurizing ethylene of 0.5 MPa. Vibration was initiated to break the ampoule, thereby initiating polymerization.

According to the need, ethylene was supplied via a flexible joint so as to maintain an ethylene partial pressure in the reactor. Polymerization was conducted at 105° C. for 1 hour and supply of ethylene was stopped. The reactor was cooled to room temperature, gas was discharged and the contents were taken out of the reactor. As a result, 19 g of polyethylene was obtained. The polymerization activity per 1 g of catalyst, 1 hour of polymerization and 1 MPa of ethylene was 380 g/g·hr·MPa. The results of measurement of physical properties are shown in Table 2 below.

COMPARATIVE EXAMPLE 10

A catalyst was prepared such that tris[bis(trimethylsilyl)methyl]chromium(III) was not added in Example 15 (4), and polymerization was conducted in the same manner as in Example 15. As a result, 108 g of polyethylene was obtained. The polymerization activity per 1 g of catalyst, 1 hour of polymerization and 1 MPa of ethylene was 640 g/g·hr·MPa. The results of measurement of physical properties are shown in Table 2 below. It is apparent from the Table that molecular weight is high and molecular weight distribution is broad as compared with the cases of Example 15 and Example 16.

COMPARATIVE EXAMPLE 11

A catalyst was prepared such that tetrakis(2,2-dimethylpropyl)chromium(IV) was not added in Example 15 (4), and polymerization was conducted in the same manner as in Example 15. As a result, 119 g of polyethylene was obtained. The polymerization activity per 1 g of catalyst, 1 hour of polymerization and 1 MPa of ethylene was 710 g/g·hr·MPa. The results of measurement of physical properties are shown in Table 2 below. It is apparent from the Table that molecular weight is high and molecular weight distribution is broad as compared with the cases of Example 15 and Example 17.

COMPARATIVE EXAMPLE 12

A catalyst was prepared in the same manner as in Example 15 except that tris[bis(trimethylsilyl)methyl]chromium(III) was not added in Example 15 (4) and tetrakis(2-methyl-2-phenylpropyl)chromium(IV) synthesized in Example 17 (1) was added as the tetravalent alkyl chromium compound such that the chromium atom supporting amount was 0.20%, in place of tetrakis(2,2-dimethylpropyl)chromium(IV), and polymerization was conducted in the same manner as in Example 15. As a result, 113 g of polyethylene was obtained. The polymerization activity per 1 g of catalyst, 1 hour of polymerization and 1 MPa of ethylene was 670 g/g·hr·MPa. The results of measurement of physical properties are shown in Table 2 below. It is apparent from the Table that molecular weight is high and molecular weight distribution is broad as compared with the cases of Example 17 and Example 18.

COMPARATIVE EXAMPLE 13

A catalyst was prepared in the same manner as in Example 15 except that in Example 15 (4), 2.3 ml of a hexane solution of tris(2,2,3-trimethyl-1-bicyclo-[2,2,1]-heptyl)chromium (III) (called tris(4-camphyl)chromium(III)) synthesized in Example 16 (1) (chromium atom supporting amount= 0.20%) was added in place of tris[bis(trimethylsilyl)methyl] chromium(III) and tetrakis(2,2-dimethylpropyl)chromium (IV) was not added, and polymerization was conducted in the same manner as in Example 15. As a result, 126 g of polyethylene was obtained. The polymerization activity per 1 g of catalyst, 1 hour of polymerization and 1 MPa of ethylene was 750 g/g·hr·MPa. The results of measurement of physical properties are shown in Table 2 below. It is apparent from the Table that molecular weight is high and molecular weight distribution is broad as compared with the cases of Example 16 and Example 18.

COMPARATIVE EXAMPLE 14

(1) Preparation of Chromocene Catalyst

Chromocene catalyst was prepared in the same method as described in Jpn. J. Appl. Phys., Vol. 32, Suppl. 32–2, 511(1993) as follows.

3.0 g of silica (a product of W.R. Grace Corporation, grade 952, average particle size 80 μm, specific surface area 300 m$^2$/g, pore volume 1.6 cm$^3$/g) calcined at 600° C. for 24 hours was put into a 100 ml flask the inner atmosphere of which had previously replaced by nitrogen gas, and 30 ml of hexane was added thereto to form a slurry. A heptane solution of bis(cyclopentadienyl)chromium(II) (called chromocene) (a product of STERM CO.) was added such that chromium atom supporting amount was 1.0%, and the resulting mixture was stirred at 30° C. for 1 hour. Solvent was removed under reduced pressure to obtain a dry free flowing catalyst.

(2) Polymerization

Polymerization was conducted in the manner as in Example 15 except that in Example 15 (5), chromocene catalyst obtained in (1) above was used in place of the catalyst obtained in Example 15 (4) and hydrogen of 0.2 MPa was introduced. As a result, 27 g of polyethylene was obtained. The polymerization activity per 1 g of catalyst, 1 hour of polymerization and 1 MPa of ethylene was 160 g/g·hr·MPa. The results of measurement of physical properties are shown in Table 2 below. It is apparent from the Table that molecular weight and molecular weight distribution are the same, but density is high and copolymerizabity is considerably low, as compared with the cases of Examples 15 to 20.

COMPARATIVE EXAMPLE 15

Polymerization was conducted in the same manner as in Example 15 using, in Example 15 (5), a catalyst obtained by calcining Phillips catalyst (a product of W.R. Grace Corporation, Magnapore 963, chromium atom supporting amount=1.0%, titanium atom supporting amount=2.5%) at 800° C. for 18 hours for activation in place of the catalyst obtained in Example 15 (4). As a result, 260 g of polyethylene was obtained. The polymerization activity per 1 g of catalyst, 1 hour of polymerization and 1 MPa of ethylene was 1,550 g/g·hr·MPa. The results of measurement of physical properties are shown in Table 2 below. It is apparent from the Table that molecular weight is high and molecular weight distribution is broad as compared with the cases of Examples 15 to 20.

TABLE 2

| Example Number | Trivalent alkyl chromium compound | Tetravalent alkyl chromium compound | Activity (g/g · hr · MPa) | MFR (g/10 min) | HLMFR (g/10 min) | Mn (×10$^4$) | Mw (×10$^4$) | Mw/Mn | Density (g/cm$^3$) |
|---|---|---|---|---|---|---|---|---|---|
| 15 | Cr[CH(SiMe$_3$)$_2$]$_3$ | Cr(CH$_2$CMe$_3$)$_4$ | 1380 | 8.4 | 380 | 1.0 | 8.1 | 8.1 | 0.9312 |
| 16 | Cr(4-camphyl)$_3$ | Cr(CH$_2$CMe$_3$)$_4$ | 1420 | 7.6 | 350 | 1.1 | 9.0 | 8.2 | 0.9311 |
| 17 | Cr[CH(SiMe$_3$)$_2$]$_3$ | Cr(CH$_2$CMe$_2$Ph)$_4$ | 1560 | 8.7 | 390 | 0.9 | 7.1 | 7.9 | 0.9320 |
| 18 | Cr(4-camphyl)$_3$ | Cr(CH$_2$CMe$_2$Ph)$_4$ | 1440 | 8.0 | 350 | 1.1 | 9.0 | 8.2 | 0.9315 |
| 19 | Cr[CH(SiMe$_3$)$_2$]$_3$ | Cr(CH$_2$CMe$_3$)$_4$ | 1270 | 9.2 | 410 | 0.8 | 6.6 | 8.2 | 0.9318 |
| 20 | Cr[CH(SiMe$_3$)$_2$]$_3$ | Cr(CH$_2$CMe$_3$)$_4$ | 380 | 8.9 | 400 | 0.9 | 7.4 | 8.2 | 0.9309 |
| Comparative Example 10 | — | Cr(CH$_2$CMe$_3$)$_4$ | 640 | 0.3 | 17 | 1.2 | 22.1 | 18.4 | 0.9503 |
| Comparative Example 11 | Cr[CH(SiMe$_3$)$_2$]$_3$ | — | 710 | 1.1 | 60 | 1.1 | 15.5 | 14.1 | 0.9533 |
| Comparative Example 12 | — | Cr(CH$_2$CMe$_2$Ph)$_4$ | 670 | 0.2 | 15 | 1.2 | 24.0 | 20.0 | 0.9505 |
| Comparative Example 13 | Cr(4-camphyl)$_3$ | — | 750 | 1.2 | 63 | 1.1 | 15.7 | 14.3 | 0.9535 |
| Comparative Example 14 | Chromocene catalyst | | 160 | 8.6 | 390 | 1.0 | 8.0 | 8.0 | 0.9631 |
| Comparative Example 15 | Phillips catalyst | | 1550 | 1.0 | 63 | 1.1 | 12.8 | 11.6 | 0.9545 |

EXAMPLE 21

Two-stage Polymerization:

Isobutane and the catalyst obtained in Example 15 (4) were continuously supplied to a first reactor having an inner volume of 200 liters at the supply rate of 120 liters/hour and 15 g/hour, respectively. While discharging the contents in the reactor at a predetermined rate, ethylene, hydrogen and 1-hexene were supplied to the reactor so as to maintain mass ratio of hydrogen to ethylene in a liquid phase at 7.0×10$^{-5}$ and mass ratio of 1-hexene to ethylene in a liquid phase of 6.0×10$^{-1}$, at 90° C., and the first stage copolymerization was continuously conducted in the full liquid state under the conditions of total pressure 4.1 MPa and average retention time 0.8 hour. Entire amount of a slurry of isobutane containing ethylene/1-hexene copolymer formed by copolymerization was introduced into a second-stage reactor having an inner volume of 400 liters through a connecting pipe having an inner diameter of 50 mm. Isobutane (55 liters/hour) and hydrogen were supplied without adding a catalyst, and while discharging the contents in the reactor at a predetermined rate, ethylene and hydrogen were supplied to the reactor so as to maintain mass ratio of hydrogen to ethylene in a liquid phase at 9.0×10$^{-3}$, at 105° C., and the second stage copolymerization was continuously conducted under the conditions of total pressure 4.1 MPa and average retention time 1.1 hours to obtain polyethylene. The proportion of a high molecular weight component in the first stage was 47 parts by mass, and the proportion of a low molecular weight component in the second stage was 53 parts by mass. The results of measurement of physical properties are shown in Table 3 below.

COMPARATIVE EXAMPLE 16

(1) Preparation of Ziegler Catalyst 20 kg of commercially available magnesium ethylate, 1.7 kg of aluminum trichloride and 2.7 kg of diphenyldiethoxysilane are placed in a pot (grinding vessel) having an inner volume of 160 liters and containing about 260 kg of porcelain-made balls having a diameter of 15.4 mm, under nitrogen gas atmosphere. The pot was vibrated using a vibration ball mill at vibration width of 8 mm and the number of vibration of 1,200 rpm for 4 hours to grind the above materials in the pot. After completion of grinding, the contents were separated from porcelain balls under nitrogen gas atmosphere. 20 kg of the ground material obtained above and 80 liters of n-heptane were added to a 80 liters reactor the inner atmosphere of which had been replaced by nitrogen gas. 41.6 liters of titanium tetrachloride was added dropwise to the reactor at room temperature while stirring, temperature of the reaction system was elevated to 90° C. and stirring was continued for 90 minutes. After cooling the reaction system, the supernatant liquid was taken off and n-hexane was added. This procedure was repeated three times. Ziegler catalyst obtained contained 11% of Ti and 59% of Cl.

(2) Two-stage Polymerization

Isobutane, triisobutyl aluminum and Ziegler catalyst obtained in (1) above were continuously supplied to a first reactor having an inner volume of 200 liters at a rate of 120 liters/hour, 175 mmol/hour and 2.6 g/hour, respectively. While discharging the contents in the reactor at a predetermined rate, ethylene, hydrogen and 1-hexene were supplied to the reactor so as to maintain mass ratio of hydrogen to ethylene in a liquid phase at $0.25 \times 10^{-3}$ and mass ratio of 1-hexene to ethylene in a liquid phase of 1.3, at 80° C., and the first stage copolymerization was continuously conducted in the full liquid state under the conditions of total pressure 4.1 MPa and average retention time 0.8 hour. Entire amount of a slurry of isobutane containing ethylene/1-hexene copolymer formed by copolymerization was introduced into a second-stage reactor having an inner volume of 400 liters through a connecting pipe having an inner diameter of 50 mm. Isobutane (55 liters/hour) and hydrogen were supplied without adding a catalyst, and while discharging the contents in the reactor at a predetermined rate, ethylene and hydrogen were supplied to the reactor so as to maintain mass ratio of hydrogen to ethylene in a liquid phase at $1.8 \times 10^{-2}$, at 90° C., and the second stage copolymerization was continuously conducted under the conditions of total pressure 4.1 MPa and average retention time 1.1 hours to obtain polyethylene. The proportion of a high molecular weight component in the first stage was 46 parts by mass, and the proportion of a low molecular weight component in the second stage was 54 parts by mass. The results of measurement of physical properties are shown in Table 3 below. As compared with the case of Example 21, melt tension was low and balance between rigidity and ESCR was poor.

COMPARATIVE EXAMPLE 17

(1) Preparation of Phillips Catalyst

Phillips catalyst (a product of W.R. Grace Corporation, Magnapore 963, chromium atom supporting amount: 1.0%, titanium atom supporting amount: 2.5%) was calcined at 800° C. for 18 hours in air.

(2) Two-stage Polymerization

Isobutane and the catalyst obtained in (1) above were continuously supplied to a first reactor having an inner volume of 200 liters at a rate of 120 liters/hour and 15 g/hour, respectively. While discharging the contents in the reactor at a predetermined rate, ethylene, hydrogen and 1-hexene were supplied to the reactor so as to maintain mass ratio of 1-hexene to ethylene in a liquid phase of $5.0 \times 10^{-1}$ at 90° C., and the first stage copolymerization was continuously conducted in the full liquid state under the conditions of total pressure 4.1 MPa and average retention time 1.2 hours. Entire amount of a slurry of isobutane containing ethylene/1-hexene copolymer formed by copolymerization was introduced into a second-stage reactor having an inner volume of 400 liters through a connecting pipe having an inner diameter of 50 mm. Isobutane was supplied at a rate of 55 liters/hour without adding a catalyst, and while discharging the contents in the reactor at a predetermined rate, ethylene was supplied to the reactor at 105° C., and the second stage copolymerization was conducted under the conditions of total pressure 4.1 MPa and average retention time 0.8 hours to obtain polyethylene. The proportion of a high molecular weight component in the first stage was 49 parts by mass, and the proportion of a low molecular weight component in the second stage was 51 parts by mass. The results of measurement of physical properties are shown in Table 3 below. As compared with the case of Example 21, melt tension was low and balance between rigidity and ESCR was poor.

COMPARATIVE EXAMPLE 18

Isobutane and chromocene catalyst obtained in Comparative Example 5 were continuously supplied to a first reactor having an inner volume of 200 liters at a rate of 120 liters/hour and 80 g/hour, respectively. While discharging the contents in the reactor at a predetermined rate, ethylene, hydrogen and 1-hexene were supplied to the reactor so as to maintain mass ratio of hydrogen to ethylene in a liquid phase at $5.0 \times 10^{-5}$ and mass ratio of 1-hexene to ethylene in a liquid phase of $6.0 \times 10^{-1}$, at 90° C., and the first stage copolymerization was continuously conducted in the full liquid state under the conditions of total pressure 4.1 MPa and average retention time 1.2 hour. Entire amount of a slurry of isobutane containing ethylene/1-hexene copolymer formed by copolymerization was introduced into a second-stage reactor having an inner volume of 400 liters through a connecting pipe having an inner diameter of 50 mm. Isobutane (55 liters/hour) and hydrogen were supplied without adding a catalyst, and while discharging the contents in the reactor at a predetermined rate, ethylene and hydrogen were supplied to the reactor so as to maintain mass ratio of hydrogen to ethylene in a liquid phase at $1.2 \times 10^{-3}$, at 105° C., and the second stage copolymerization was conducted under the conditions of total pressure 4.1 MPa and average retention time 1.1 hours to obtain polyethylene. The proportion of a high molecular weight component in the first stage was 48 parts by mass, and the proportion of a low molecular weight component in the second stage was 52 parts by mass. The results of measurement of physical properties are shown in Table 3 below. As compared with the case of Example 21, melt tension is low and copolymerizability is very low, so that density does not decrease. Further, although rigidity is high, ESCR is greatly low.

TABLE 3

| Example Number | Trivalent alkyl chromium compound | Tetravalent alkyl chromium compound | HLMFR (g/10 min) | Density (g/cm³) | Mw/Mn | Melt tension (g) | Rigidity (kgf/cm²) | ESCR (hr) |
|---|---|---|---|---|---|---|---|---|
| 21 | $Cr[CH(SiMe_3)_2]_3$ | $Cr(CH_2CMe_3)_4$ | 12.1 | 0.9513 | 53.5 | 22.5 | 13700 | 1500 |
| Comparative Example 16 | Ziegler catalyst | | 11.5 | 0.9515 | 30.0 | 7.0 | 13600 | 310 |
| Comparative Example 17 | Phillips catalyst | | 13.5 | 0.9513 | 26.5 | 15.8 | 13000 | 110 |
| Comparative Example 18 | Chromocene catalyst | | 12.8 | 0.9590 | 51.6 | 10.5 | 15100 | 30 |

What is claimed is:

1. A catalyst for the production of an ethylene polymer, comprising:
   a trivalent alkyl chromium compound represented by the following formula (4):

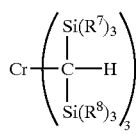

$$(4)$$

wherein $R^7$ and $R^8$ which may be the same or different each represent an alkyl group having 1 to 18 carbon atoms or an aryl group having 6 to 18 carbon atoms; and $R^7$ and $R^8$ may be connected to form a ring, and
   an inorganic oxide solid.

2. A catalyst for the production of an ethylene polymer, comprising:
   is trivalent alkyl chromium compound represented the following formula (4):

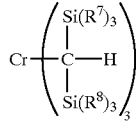

$$(4)$$

wherein $R^7$ and $R^8$ which may be the same or different each represent an alkyl group having 1 to 18 carbon atoms or an aryl group having 6 to 18 carbon atoms; and $R^7$ and $R^8$ may be connected to form a ring,
   an inorganic oxide solid, and
   an organoaluminum compound represented by the following formula (2)

$$(R^4)_n Al(X)_{3-n} \qquad (2)$$

wherein a plurality of $R^4$ which may be the same or different each represent an alkyl group having 1 to 18 carbon atoms, a plurality of X which may be the same or different each represent a halogen atom, an alkoxyl group, siloxy group or hydrogen atom and n is an integer of 1 to 3.

3. The catalyst for the production of an ethylene polymer as claimed in claim 2, which is obtained by supporting the trivalent alkyl chromium compound represented by the formula (4) on the inorganic oxide solid and then reacting the solid catalyst component obtained with the organoaluminum compound represented by the formula (2).

4. The catalyst for the production of an ethylene polymer as claimed in claim 3, which is obtained by supporting the trivalent alkyl chromium compound represented by the formula (4) in an amount of 0.01 to 10% in terms of chromium atom to the inorganic oxide solid, on the inorganic oxide solid and then reacting the solid catalyst component obtained with the organoaluminum compound represented by the formula (2) in the proportion such that a molar ratio of aluminum atom/chromium atom is 1 to 1000.

5. A catalyst for the production of an ethylene polymer, comprising:
   a trivalent alkyl chromium compound represented by the following formula (1):

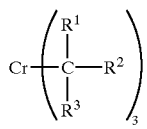

$$(1)$$

wherein $R^1$, $R^2$ and $R^3$ which may be the same or different each represent hydrogen atom, an alkyl group having 1 to 18 carbon atoms, an aryl group having 6 to 18 carbon atoms or silyl group substituted with an alkyl group having 1 to 18 carbon atoms or an aryl group having 6 to 18 carbon atoms, provided that $R^1$, $R^2$ and $R^3$ are not simultaneously hydrogen atom; and at least two of $R^1$, $R^2$ and $R^3$ may be connected to form a ring,
   a tetravalent alkyl chromium compound represented by the following formula (5)

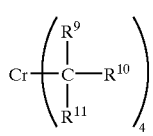

$$(5)$$

wherein $R^9$, $R^{10}$ and $R^{11}$ which may be the same or different each represent hydrogen atom, an alkyl group having 1 to 18 carbon atoms, an aryl group having 6 to 18 carbon atoms or silyl group substituted with an alkyl group having 1 to 18 carbon atoms or an aryl group having 6 to 18 carbon atoms, provided that $R^9$, $R^{10}$ and $R^{11}$ are not simultaneously hydrogen atom; and at least two of $R^9$, $R^{10}$ and $R^{11}$ may be connected to form a ring, and
   an inorganic oxide solid.

6. The catalyst for the production of an ethylene polymer as claimed in claim 5, wherein the trivalent alkyl chromium compound represented by the formula (1) and the tetravalent alkyl chromium compound represented by the formula (5) are supported on the inorganic oxide solid.

7. The catalyst for the production of an ethylene polymer as claimed in claim 6, wherein the amount of the trivalent alkyl chromium compound represented by the formula (1) and the tetravalent alkyl chromium compound represented by the formula (5) supported on the inorganic oxide solid is 0.01 to 5% in terms of chromium atom to the inorganic oxide solid.

8. The catalyst for the production of an ethylene polymer as claimed in claim 6 or 7, wherein the ratio of the trivalent alkyl chromium compound represented by the formula (1) and the tetravalent alkyl chromium compound represented by the formula (5) supported on the inorganic oxide solid is 1 to 99:99 to 1 in terms of mass ratio of chromium atom.

9. The catalyst for the production of an ethylene polymer as claimed in claim 5, wherein the inorganic oxide solid has been calcined at 400 to 900° C.

10. A process for producing an ethylene polymer, which comprises using the catalyst for the production of an ethylene polymer as claimed in claim 1.

11. A process for producing an ethylene polymer, which comprises using the catalyst for the production of an ethylene polymer as claimed in any one of claims 2 to 4.

12. A process for producing an ethylene polymer, which comprises using the catalyst for the production of ethylene polymer as claimed in claim 5.

13. The process for producing an ethylene polymer as claimed in claim 12, which comprises conducting a multi-stage polymerization by connecting at least two reactors.

* * * * *